US010001578B2

(12) United States Patent
Mandal et al.

(10) Patent No.: US 10,001,578 B2
(45) Date of Patent: Jun. 19, 2018

(54) NUCLEAR MAGNETIC RESONANCE REFOCUSING PULSES FOR INHOMOGENEOUS MAGNETIC FIELDS

(71) Applicant: SCHLUMBERGER TECHNOLOGY CORPORATION, Sugar Land, TX (US)

(72) Inventors: Soumyajit Mandal, Cambridge, MA (US); Van D. M. Koroleva, Cambridge, MA (US); Troy Borneman, Waterloo (CA); Martin D. Hürlimann, Newton, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 895 days.

(21) Appl. No.: 14/272,325

(22) Filed: May 7, 2014

(65) Prior Publication Data

US 2015/0323698 A1    Nov. 12, 2015

(51) Int. Cl.
*G01V 3/00* (2006.01)
*G01V 3/14* (2006.01)
*G01V 3/32* (2006.01)
*G01V 3/38* (2006.01)

(52) U.S. Cl.
CPC ............... *G01V 3/14* (2013.01); *G01V 3/32* (2013.01); *G01V 3/38* (2013.01)

(58) Field of Classification Search
CPC ............. G01V 3/14; G01V 3/32; G01V 3/38
USPC .......................................................... 324/309
See application file for complete search history.

(56) References Cited

U.S. PATENT DOCUMENTS

| 5,629,623 | A | 5/1997 | Sezginer et al. | |
|---|---|---|---|---|
| 6,332,088 | B1 * | 12/2001 | Zhang | A61B 5/055 324/307 |
| 6,392,410 | B2 | 5/2002 | Luong et al. | |
| 7,852,078 | B2 * | 12/2010 | Jensen | G01R 33/50 324/307 |
| 2003/0071617 | A1 * | 4/2003 | Kruspe | G01R 33/4616 324/303 |
| 2012/0001629 | A1 | 1/2012 | Hopper et al. | |
| 2013/0162247 | A1 * | 6/2013 | Hurlimann | G01N 24/081 324/303 |

(Continued)

OTHER PUBLICATIONS

Marble, "Optimization of Echo Amplitudes Resulting From a Series of 90° Pulses in an Inhomogeneous Static Field", Journal of Magnetic Resonance, Jan. 2012, 216(2012) 37-42.*

(Continued)

*Primary Examiner* — Susan Lee

(57) ABSTRACT

A method for applying a nuclear magnetic resonance (NMR) sequence is described herein. The method includes applying a series of refocusing pulses to a substance within an inhomogeneous static magnetic field. Each refocusing pulse in the series of refocusing pulses includes a central axis, a total pulse duration greater than $t_{180}$, and at least five segments (e.g., 5, 7, 11, 20, and 21). The phase of each segment is substantially anti-symmetric about the central axis of the refocusing pulse. In a more particular embodiment, the phase of each segment is also symmetric about the central axis of the refocusing pulse and the five segments include a substantially constant amplitude.

16 Claims, 13 Drawing Sheets

(56) References Cited

U.S. PATENT DOCUMENTS

2013/0234705 A1 9/2013 Mandal et al.
2015/0042337 A1 2/2015 Song

OTHER PUBLICATIONS

Odedra et al., "Use of Composite Refocusing Pulses to Form Spin Echoes",Journal of Magnetic Resonance, Oct. 2011, 214 (2012) 68-75.*

Odedra et al., Dual-compensated antisymmetric composite refocusing pulses for NMR, Oct. 2012, Journal of Magnetic Resonance.*

Odedra et al., "Use of composite refocusing pulses to form spin echoes", Oct. 2011, Journal of Magnetic Resonance.*

Benson, et al., "The Application of Spin Echoes to Stray-Field Imaging", Journal of Magnetic Resonance, Series B, vol. 109, Issue 3, Dec. 1995, pp. 314-317.

Biercuk, et al., "Optimized dynamical decoupling in a model quantum memory", Nature, vol. 458, Apr. 23, 2009, pp. 996-1000.

Boehlen, et al., "Frequency-modulated "chirp" pulses for broadband inversion recovery in magnetic resonance", Journal of Magnetic Resonance, vol. 90, No. 1, 1990, pp. 183-191.

Borneman, et al., "Application of Optimal Control to CPMG Refocusing Pulse Design", Journal of Magnetic Resonance, vol. 207, 2010, pp. 220-233.

Carr, et al., "Effects of Diffusion on Free Procession in Nuclear Magnetic Resonance Experiments", Physical Review, vol. 94, No. 3, May 1, 1954, pp. 630-638.

Eidmann, et al., "The NMR Mouse, a mobile universal surface explorer", Journal of Magnetic Resonance Series A, vol. 122, Jan. 1996, pp. 104-109.

Goelman, et al., "The CPMG Pulse Sequence in Strong Magnetic Field Gradients with Applications to Oil-Well Logging", Journal of Magnetic Resonance, Series A, vol. 113, Issue 1, Mar. 1995, pp. 11-18.

Grinolds, et al., "Nanoscale magnetic imaging of a single electron spin under ambient conditions", Nature Physics, vol. 9, 2013, pp. 215-219.

Hürlimann, et al., "Carr-Purcell sequences with composite pulses", Journal of Magnetic Resonance,vol. 152, No. 1, Sep. 2001, pp. 109-123.

Hürlimann, et al., "Quantitative Measurement of Two-Dimensional Distribution Functions of Diffusion and Relaxation in Grossly Inhomogeneous Fields", Journal of Magnetic Resonance, vol. 157, Issue 1, Jul. 2002, pp. 31-42.

Hürlimann, et al., "Spin dynamics of Carr-Purcell-Meiboom-Gill-like sequences in grossly inhomogeneous B(0) and B(1) fields and application to NMR well logging", Journal of Magnetic Resonance, vol. 143, No. 1, Mar. 2000, pp. 120-135.

Khaneja, et al., "Optimal control of coupled spin dynamics: design of NMR pulse sequences by gradient ascent algorithms", Journal of Magnetic Resonance, vol. 172, Issue 2, Feb. 2005, pp. 296-305.

Kleinberg, et al., "Novel NMR apparatus for investigating an external sample", Journal of Magnetic Resonance, vol. 97, Issue 3, May 1992, pp. 466-485.

Kobzar, et al., "Exploring the limits of broadband 90° and 180° universal rotation pulses", Journal of Magnetic Resonance, vol. 225, Dec. 2012, pp. 142-160.

Kobzar, et al., "Exploring the limits of broadband excitation and inversion pulses", Journal of Magnetic Resonance, vol. 170, No. 2, Oct. 2004, pp. 236-243.

Kobzar, et al., "Exploring the limits of broadband excitation and inversion: II. Rf-power optimized pulses", Journal of Magnetic Resonance, vol. 194, No. 1, Sep. 2008, pp. 58-66.

Koroleva, et al., "Broadband CPMG sequence with short composite refocusing pulses", Journal of Magnetic Resonance, vol. 230, 2013, pp. 64-75.

Kupce, et al., "Adiabatic Pulses for Wideband Inversion and Broadband Decoupling", Journal of Magnetic Resonance, Series A, vol. 115, Issue 2, Aug. 1995, pp. 273-276.

Levitt, "Composite Pulses", Progress in Nuclear Magnetic Resonance Spectroscopy, vol. 18, No. 61, 1986, p. 122.

Mandal, et al., "Axis-matching excitation pulses for CPMG-like sequences in inhomogeneous fields", Journal of Magnetic Resonance, vol. 237, 2013, pp. 1-10.

Marble, et al., "Optimization of echo amplitudes resulting from a series of 90° pulses in an inhomogeneous static field", Journal of Magnetic Resonance, vol. 216, Mar. 2012, pp. 37-42.

Meiboom, et al., "Modified SpinEcho Method for Measuring Nuclear Relaxation Times", Review of Scientific Instruments, vol. 29, No. 8, 1958, pp. 688-691.

O'Dell, et al., "QCPMG using adiabatic pulses for faster acquisition of ultra-wideline NMR spectra", Chemical Physics Letters, vol. 464, Issues 1-3, Oct. 13, 2008, pp. 97-102.

Poon, et al., "180° refocusing pulses which are insensitive to static and radiofrequency field inhomogeneity", Journal of Magnetic Resonance, vol. 99, Issue 1,, Aug. 1992, pp. 45-55.

Poon, et al., "Robust Refocusing Pulses of Limited Power", Journal of Magnetic Resonance, Series A, vol. 116, Issue 2, Oct. 1995, pp. 161-180.

Ryan, et al., "Robust Decoupling Techniques to Extend Quantum Coherence in Diamond", Physical Review Letters, vol. 105, Nov. 12, 2010, p. 200402.

Shaka, et al., "Symmetric phase-alternating composite pulses", Journal of Magnetic Resonance, vol. 71, Issue 3, Feb. 15, 1987, pp. 495-503.

Skinner, et al., "Optimal control design of constant amplitude phase-modulated pulses: Application to calibration-free broadband excitation", Journal of Magnetic Resonance, vol. 179, Issue 2, Apr. 2006, pp. 241-249.

Skinner, et al., "Reducing the duration of broadband excitation pulses using optimal control with limited RF amplitude", Journal of Magnetic Resonance, vol. 167, Issue 1, Mar. 2004, pp. 68-74.

Staudacher, et al., "Nuclear Magnetic Resonance Spectroscopy on a (5-Nanometer)3 Sample Volume", Science, vol. 339, No. 6119, Feb. 1, 2013, pp. 561-563.

Taylor, et al., "High-sensitivity diamond magnetometer with nanoscale resolution", Nature Physics 4, 2008, pp. 810-816.

Wang, et al., "Effect of pulse error accumulation on dynamical decoupling of the electron spins of phosphorus donors in silicon", Physical Review Letters B, vol. 85, 2012, p. 085206.

Witzel, et al., "Multiple-pulse coherence enhancement of solid state spin qubits", Physical Review Letters, vol. 98, No. 7, Feb. 16, 2007, p. 077601.

Zweckstetter, et al., "An adiabatic multiple spin-echo pulse sequence: removal of systematic errors due to pulse imperfections and off-resonance effects", Journal of Magnetic Resonance, vol. 133, No. 1, Jul. 1998, pp. 134-147.

Casanova, et al., "Single-Sided NM", Springer, ISBN 978-3-642-16307-4, 2011.

Nielsen, et al., "Optimal Control Methods in NMR Spectroscopy", Encyclopedia of Nuclear Magnetic Resonance, John Wiley, Chichester, 2010.

Hurlimann, et al., "Well Logging", John Wiley and Sons, Inc., vol. 1, 2012, pp. 223-232.

* cited by examiner

NUCLEAR MAGNETIC RESONANCE REFOCUSING PULSES FOR INHOMOGENEOUS MAGNETIC FIELDS

TECHNICAL FIELD

This disclosure relates to nuclear magnetic resonance (NMR) measurements, and more particularly to NMR measurements that are performed in inhomogeneous static magnetic fields.

BACKGROUND

Nuclear magnetic resonance (NMR) can be used to determine properties of a substance. Oil and gas field tools use NMR systems to investigate the properties of earth formations, such as the porosity of formations or the composition of fluids within the formations. In one example, the NMR system is lowered into a wellbore that traverses a formation. The NMR system can be lowered into the wellbore as part of a wireline or drilling string. The NMR system is used to investigate the properties of the formation adjacent to the wellbore. The system includes a magnet for applying a static magnetic field to the formation adjacent to the wellbore. The system also includes a coil for applying an oscillating magnetic field to the formation adjacent to the wellbore at a particular frequency. The oscillating field is composed of a sequence of radio frequency (RF) pulses that tip the magnetization of the atomic nuclei within the formation away from an initial magnetization produced by the magnet. The sequence of pulses and the static magnetic field interact with the nuclei in a manner such that a NMR signal composed of "echoes" is generated within at least a portion of the formation. The NMR signal within the formation is detected using the coil and used to determine the properties for the formation.

The static magnetic field produced by the magnet and applied to the formation is inhomogeneous because the field decreases in strength as a function of distance from the magnet. Because of this inhomogeneous field, the NMR signal is produced in a small portion of the formation because the Larmor frequency condition (or resonance condition) is met in a small portion of the field. As is known in the art, the Larmor frequency of the atomic nuclei depends on the strength of the static magnetic field according to the following relationship:

$$\omega_0 = \gamma \times B_0$$

where $B_0$ is the strength of the static magnetic field, $\gamma$ is the gyromagnetic ratio of the atomic nuclei of interest, and $\omega_0$ is the frequency of the resonant signal that is produced by the atomic nuclei (the Larmor frequency). The small portion of the formation (or substance) that produces the resonant signal is referred to as a "shell" or "slice." In some cases, the shell has a volume of $10^{-4}$ m$^3$ (100 cc). These small shell sizes lead to a degradation in the ratio of signal power to noise power (SNR).

The shell sizes and resulting SNR can be increased by increasing the bandwidth of the RF pulses in the NMR sequence. One approach to expand the bandwidth of RF pulses is to increase the amplitude of the RF pulses in the NMR sequence by a factor, while simultaneously decreasing the duration of the pulses by the same factor. The resulting bandwidth and SNR will then increase by this factor. This solution, however, requires increasing RF field strength and average power consumption, which can be problematic for power constrained applications, such as NMR well logging applications.

Another approach is to modulate the amplitude and/or phase within the RF pulses in a particular manner. For example, the bandwidth of RF pulses can be increased by using composite, shaped, chirped, or adiabatic pulses, as compared to conventional rectangular pulses that are designed to have constant amplitude and phase. Progress has been made in the development of numerically-optimized broadband RF pulses that are robust with respect to variation of the RF field strength and other constraints. These developments have taken advantage of the availability of new algorithms for pulse sequence design based on methods of optimal control theory (OCT), which make it feasible to find new pulse sequences in an efficient manner in a high-dimensional parameter space. However, such work has been largely focused on improving the pulse fidelity, i.e., ability to approximate a given rotation operator over the desired bandwidth, and not on SNR. In addition, such pulses are typically much longer than a conventional pulse. This increase in pulse duration has the undesirable consequence that it entails an increase of the minimum echo spacing and an increase in the power consumption per RF pulse, often resulting in no net increase of SNR per unit time. This fact is of particular concern for mobile and field applications, such as NMR well logging applications.

SUMMARY

Illustrative embodiments of the present disclosure are directed to a method for applying a nuclear magnetic resonance (NMR) sequence. The method includes applying a series of refocusing pulses to a substance within an inhomogeneous static magnetic field. Each refocusing pulse in the series of refocusing pulses includes a central axis, a total pulse duration greater than $t_{180}$, and at least five segments (e.g., 5, 7, 11, 20, and 21). The phase of each segment is substantially anti-symmetric about the central axis of the refocusing pulse. In a more particular embodiment, the phase of each segment is also symmetric about the central axis of the refocusing pulse and the five segments include a substantially constant amplitude. In some embodiments, the refocusing pulses increase signal to noise ratio (SNR) when the pulses are applied to an inhomogeneous static magnetic field, while also providing for efficient power consumption.

Various embodiments of the present disclosure are also directed to a NMR system that includes: (i) a coil for applying a NMR pulse sequence to a substance, (ii) a NMR transmitter for generating the NMR pulse sequence coupled to the coil, (iii) a processor, and (iv) a memory for storing instructions executable by the processor. The instructions include providing the NMR pulse sequence to the NMR transmitter. The NMR pulse sequence includes a series of refocusing pulses. Each refocusing pulse in the series of refocusing pulses includes a central axis, a total pulse duration greater than $t_{180}$, and at least at least five segments that each include a phase. The phase of each segment is substantially anti-symmetric about the central axis of each refocusing pulse.

Illustrative embodiments of the present disclosure are further directed to a method for optimizing a NMR pulse sequence for use in an inhomogeneous magnetic field. The method includes performing an optimization for the refocusing pulses to maximize signal to noise ratio for the NMR pulse sequence. The optimization is performed using a number of constraints that include: (i) each refocusing pulse includes a total pulse duration greater than $t_{180}$, (ii) each refocusing pulse includes at least five segments, and (iii) each segment includes a phase that is substantially anti-symmetric about the central axis of each refocusing pulse.

BRIEF DESCRIPTION OF THE DRAWINGS

Those skilled in the art should more fully appreciate advantages of various embodiments of the disclosure from the following "Description of Illustrative Embodiments," discussed with reference to the drawings summarized immediately below.

DESCRIPTION OF ILLUSTRATIVE EMBODIMENTS

Illustrative embodiments of the present disclosure are directed to a method for applying a nuclear magnetic resonance (NMR) sequence. The method includes applying a series of refocusing pulses to a substance within an inhomogeneous static magnetic field. Each refocusing pulse in the series of refocusing pulses includes a central axis, a total pulse duration greater than $t_{180}$, and at least five segments (e.g., 5, 7, 11, and 21). The phase of each segment is substantially anti-symmetric about the central axis of the refocusing pulse. In a more particular embodiment, the phase of each segment is also symmetric about the central axis of the refocusing pulse (e.g., each segment has a phase of either 0 degrees or 180 degrees) and the at least five segments include a substantially constant amplitude. In some embodiments, the refocusing pulses increase signal to noise ratio (SNR) when the pulses are applied to an inhomogeneous static magnetic field, while also providing for efficient NMR transmitter power consumption. Such pulses are referred to herein as "phase alternating refocusing pulses." Details of various embodiments are discussed below.

Figure 1:
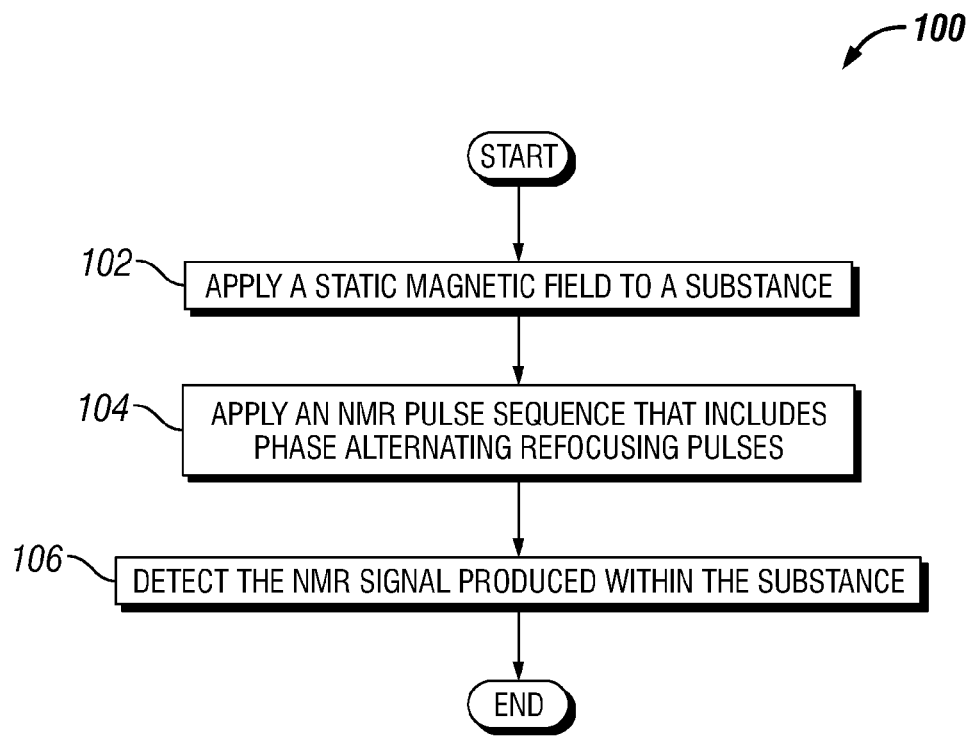
FIG. 1 shows a method of applying an NMR pulse sequence in accordance with one embodiment of the present disclosure.

FIG. 1 shows a method 100 of applying a NMR pulse sequence in accordance with one embodiment of the present disclosure. The method 100 includes applying a static magnetic field ($B_0$) to an area of interest within a substance 102, such as a reservoir formation containing hydrocarbons. In some embodiments, an inhomogeneous magnetic field is applied to the substance. The term "inhomogeneous" should be considered in the context of the NMR art. Many NMR well logging tools deploy inhomogeneous static magnetic fields due to the limitations and constraints of a wellbore environment. In this context, an inhomogeneous static magnetic field is a static magnetic field that varies in intensity or direction within an area of interest of a substance. In one example, an inhomogeneous static magnetic field within a shell of the substance may vary in intensity by a value approximately equal to or greater than a nominal RF magnetic field ($B_1$) amplitude of an NMR pulse sequence applied to the area of interest. As explained above, the small portion of the substance that produces a resonant signal is referred to as a "shell" or "slice." The inhomogeneous static field variation within a shell will be proportional to the intensity of $B_1$. For example, with rectangular pulses the variation is approximately $2B_1$. As $B_1$ increases the shell becomes thicker, so more variation in the static field occurs within the shell.

Figure 2:
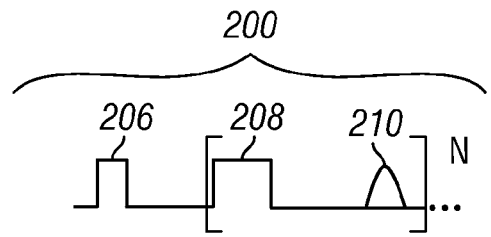
FIG. 2 shows a NMR pulse sequence in accordance with one embodiment of the present disclosure.
Figure 3:
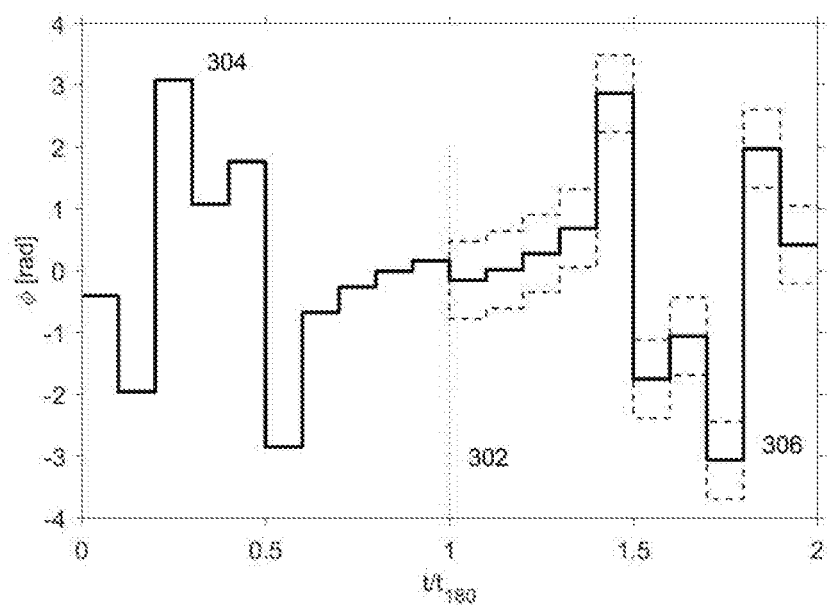
FIG. 3 shows phase alternating refocusing pulses with anti-symmetry in accordance with various embodiments of the present disclosure.

Once the static magnetic field is applied to the area of interest, the method includes applying a NMR pulse sequence to the area of interest within the substance 104. The NMR pulse sequence includes a series of radio frequency (RF) pulses. FIG. 2 shows one example of a NMR pulse sequence 200. The pulse sequence 200 include an excitation pulse 206 followed by a series of phase alternating refocusing pulses 208. In one specific embodiment, the excitation pulse 206 has a length of $t_{90}$ and the phase alternating refocusing pulses 208 have lengths greater than $t_{180}$. The quantity $t_{90}$ is defined as: $t_{90}=\pi/2(\gamma \times B_1)$, where $\gamma$ is the gyromagnetic ratio of a nucleus of interest and $B_1$ is the maximum amplitude of an applied circularly-polarized magnetic field in a rotating frame within the area of interest in the substance (e.g., in many cases, $B_1$ is half the amplitude of the linearly-polarized magnetic field produced by a coil). The quantity $t_{180}$ is defined as: $t_{180}=\pi(\gamma \times B_1)=2 \times t_{90}$. The excitation pulse 206 can be a rectangular excitation pulse or an "axis-matching excitation pulse," as will be further described below. Larger SNR can be obtained by using axis-matching excitation pulses in combination with the phase alternating pulses described herein. Following the excitation pulse 206, each phase alternating refocusing pulse 208 produces a corresponding echo 210. The phase alternating refocusing pulses 208 and corresponding echoes 210 are repeated a number of times (e.g., N=10, N=100, N=1000). In one specific example, the NMR pulse sequence is a Carr, Purcell, Meiboom and Gill (CPMG) sequence.

The NMR pulse sequence 200 applied to the substance generates resonant signals within a portion of the substance (e.g., shell). The resonant signal is composed of the series of echoes 210. In accordance with the method 100 shown in FIG. 1, the resonant signal 210 generated by the NMR pulse sequence 200 is detected. This detected signal can be used to determine NMR properties for the substance (e.g., $T_1$ relaxation time, $T_2$ relaxation time, diffusion, and/or a correlation function of such properties). In turn, the NMR properties can be used to determine physical properties of the substance, such as the chemical composition of the substance and/or the presence of a solid phase, a liquid phase, and/or a gas phase within the substance. Furthermore, in NMR logging applications, this detected signal can be used to study the properties of rocks (e.g., porosity and pore size distribution) and the properties of fluids (e.g., viscosity and diffusion).

Various embodiments of the phase alternating refocusing pulses described herein increase signal to noise ratio (SNR) when the pulses are applied to an inhomogeneous static magnetic field, while also providing for efficient NMR transmitter power consumption. In a homogenous static magnetic field, the portion of the substance that produces a resonant signal (e.g., a shell) will be broad across an area of interest within the substance because the field ($B_0$) is constant. In an inhomogeneous static magnetic field, the field changes across the area of interest and NMR pulse sequences at a particular frequency produce resonant signals in a limited region within the area of interest. These small shell sizes lead to a degradation in the ratio of signal power to noise power (SNR). The phase alternating refocusing pulses described herein provide for expanded "bandwidth" that produces a resonant signal in a larger portion of the area of interest and thus increases SNR. In various embodiments, the phase alternating refocusing pulses produce an increase in SNR without relying on an increase in the amplitude of the pulses in the NMR sequence. In this manner, the phase alternating refocusing pulses produce an increase in SNR, while also providing for efficient power consumption.

FIGS. 3, 4A, 4B, and 5A-5G show phase alternating refocusing pulses in accordance with various embodiments of the present disclosure. The refocusing pulses include a central axis 302 and at least five segments (e.g., 5, 7, 9, 10, 11, 20, and 21) that each comprise a phase ($\varphi$). For example, the refocusing pulse in FIG. 3 includes 20 segments, while, in FIGS. 4A and 4B, the refocusing pulses includes 11 segments and 17 segments, respectively. In addition, in various embodiments, the length of each segment is an integer multiple of 0.1 times $t_{180}$.

The phase ($\varphi$) of each segment is substantially anti-symmetric about the central axis of each refocusing pulse. Each segment within the refocusing pulse meets the following condition: $\varphi(t)=-\varphi(-t)$ (in modulo $2\pi$), for a pulse centered about t=0. For example, in FIG. 3, segments 304 and 306 are equidistant with respect to the central axis 302 and thus include opposite phases. In this example, the phase of segment 304 is 3 radians and the phase of segment 306 is −3 radians. Perfect anti-symmetry produces the greatest SNR, but improved SNR can also be achieved using pulses with phases that are substantially anti-symmetric. A segment is substantially anti-symmetric about the central axis of the refocusing pulse when the phase of the segment is within 36 degrees of the perfect anti-symmetry. For example, if the phase of a segment is 90 degrees, the phase of a second segment (equidistant with respect to the central axis 302) is substantially anti-symmetric when the phase falls within 36 degrees of 270 degrees, which is the perfect anti-symmetry. Thus, the second segment is substantially anti-symmetric when it has a phase in a range between 234 and 306 degrees.

In some embodiments, the refocusing pulses include phases that are both substantially anti-symmetric and symmetric about the central axis 302 of the refocusing pulse. For example, in FIGS. 4A and 4B, the refocusing pulses include phases that are both anti-symmetric and symmetric about the central axes 302 of the refocusing pulses. To meet this condition, each segment within the refocusing pulses includes a phase of either 0 degrees or 180 degrees ($\pi$). For example, in FIG. 4A, segments 308 and 310 are equidistant with respect to the central axis 302 and thus both include phases of 0 degrees. Perfect anti-symmetry and symmetry (segments with either 0 or 180 degrees) produce the greatest SNR, but improved SNR can also be achieved using pulses with phases that are substantially anti-symmetric and symmetric. A segment is substantially anti-symmetric and symmetric about the central axis of the refocusing pulse when the phase of the segment is within 36 degrees of the perfect anti-symmetry and symmetry. For example, if the phase of a segment is 0 degrees, the phase of a second segment (equidistant with respect to the central axis 302) is substantially anti-symmetric and symmetric when the phase falls within 36 degrees of 0 degrees, which is the perfect anti-symmetry and symmetry (e.g., in a range between 324 and 36 degrees).

Figure 4A:
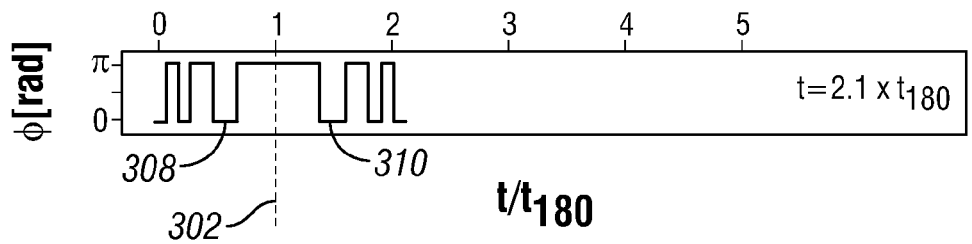
FIGS. 4A and 4B show phase alternating refocusing pulses with symmetry and anti-symmetry in accordance with various embodiments of the present disclosure.

Illustrative embodiments of the refocusing pulses include total pulse durations greater than $t_{180}$ (a sum in temporal duration of the segments). In some embodiments, the total pulse durations are greater than 1.414 (the square root of 2) times $t_{180}$. For example, the refocusing pulse in FIG. 3 has a duration of 2.0 times $t_{180}$, the refocusing pulse in FIG. 4A has a duration of 2.1 times $t_{180}$, and the refocusing pulse in FIG. 4B has a duration of 3.1 times $t_{180}$. Each segment of the refocusing pulses can have a variety of different durations. In some embodiments, each segment has a duration between 0.09 times $t_{180}$ to 1.1 times $t_{180}$. In FIG. 4A, the refocusing pulse includes segments with durations of 0.7 times $t_{180}$, 0.2 times $t_{180}$, and 0.1 times $t_{180}$.

Figure 5A:
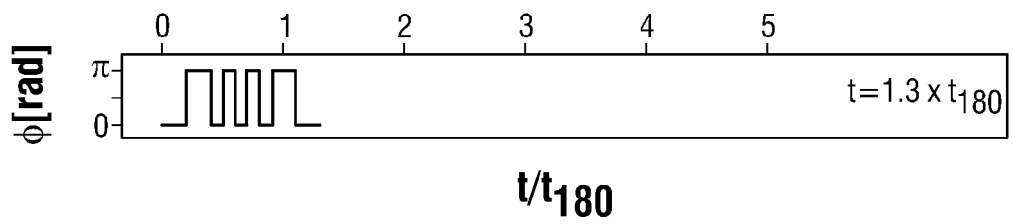
FIGS. 5A-5G show phase alternating refocusing pulses with symmetry and anti-symmetry in accordance with further embodiments of the present disclosure.
Figure 5B:
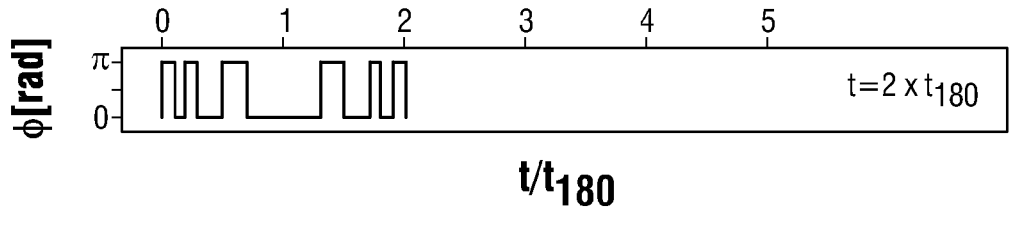
Figure 5C:
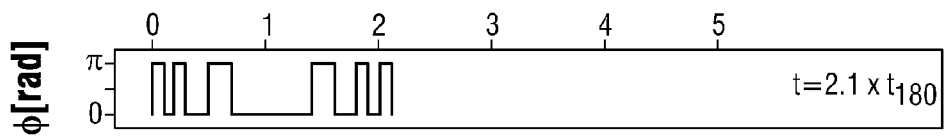
Figure 5D:
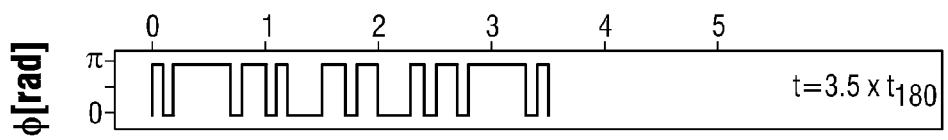
Figure 5E:
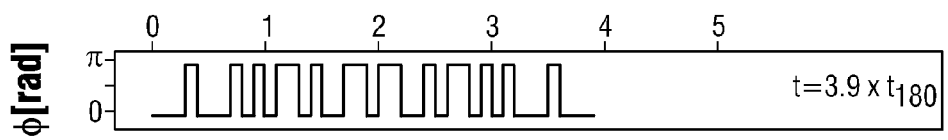
Figure 5F:
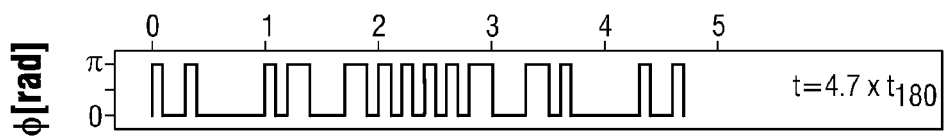
Figure 5G:
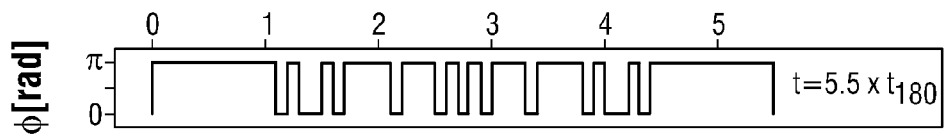

FIGS. 5A-5G show examples of seven more phase alternating refocusing pulses with phases that are both anti-symmetric and symmetric about a central axis of each refocusing pulse. These refocusing pulses range in duration between 1.3 times $t_{180}$ (FIG. 5A) and 5.5 times $t_{180}$ (FIG. 5G). The phase alternating refocusing pulses also have between 9 segments (FIG. 5A) and 23 segments (FIG. 5G).

In various embodiments, the refocusing pulses have substantially constant amplitude. For example, in one specific embodiment, each segment within the refocusing pulse has the same amplitude. Refocusing pulses with perfectly constant amplitude produce the greatest SNR (e.g. each pulse has an amplitude of 1 Gauss (G)), but improved SNR can also be achieved using pulses with refocusing pulses that include substantially constant amplitudes. A refocusing pulse has substantially constant amplitude when the amplitude of each segment is within 20% of the average amplitude of the pulse (e.g., when the average amplitude is 1.0 G, each segment is within the range of 0.8 G to 1.2 G). In various embodiments, the refocusing pulses have average amplitude between 1 G and 10 G.

Illustrative embodiments of the present disclosure are also directed to determining characteristics of phase alternating refocusing pulses, such as a resulting SNR for the refocusing pulses, when used in combination with various excitation pulses. The description below provides a review of relevant spin dynamics for an ensemble of uncoupled spins ½ placed in inhomogeneous $B_1$ and $B_0$ fields. The exemplary case considered herein includes a generalized CPMG-like sequence that consists of an initial excitation pulse followed by a long train of equally-spaced and identical refocusing pulses. The excitation and refocusing pulses can be simple rectangular pulses, complex composite pulses, or shaped pulses. The exemplary case considers the limit when the echo spacing ($t_E$) is much shorter than the transverse relaxation time ($T_2$) and also short enough to make diffusion effects negligible. In this case, the propagator from echo to echo for any spin can be approximated by an effective rotation $R(\hat{n}, \theta)$. The rotation is characterized by an axis $\hat{n}(\omega_0, \omega_1)$ and nutation angle $\theta(\omega_0, \omega_1)$ that depend on the Larmor frequency ($\omega_0$), the strength of the oscillating RF field, ($\omega_1$) (which is assumed to be much smaller than $\omega_0$), and the echo spacing $t_E$. If the magnetization following the excitation pulse is $\vec{M}(0^+)$, then the magnetization at the nominal center of the k-th echo can be written as:

$$\vec{M}_k = e^{-kt_E/T_{2,eff}} R(\hat{n}, k\theta)\{\vec{M}(0^+)\} \quad (1)$$

The effective relaxation time $T_{2,eff}$ depends in general on both $T_1$ and $T_2$. In the limiting case of $T_1$ is equal to $T_2$, then $T_{2,eff}$ is equal to $T_2$. The CPMG component can be identified as the component of the initial magnetization $\vec{M}(0^+)$ that is aligned with the axis $\hat{n}$. At the nominal echo time of the k-th echo, $t_k = kt_E$, this component is invariant under the multiple application of the rotation R and becomes independent of k except for relaxation. In contrast, the component of $\vec{M}(0^+)$ that is perpendicular to $\hat{n}$ evolves from echo to echo. This component gives rise to the oscillating Carr-Purcell (CP) part of the signal. For a sample substance in inhomogeneous fields, the CP components from different spins quickly dephase from each other and do not contribute to the detected signal after only a few echoes. The overall signal for the CPMG sequence in inhomogeneous fields shows therefore an initial transient with contributions from both the CPMG and CP components before it enters the asymptotic regime controlled by the CPMG component. In this asymptotic regime, the spectrum of the echo is given by:

$$S_{asy}(\omega_0, \omega_1) = (\hat{n} \cdot \vec{M}(0^+))\hat{n}_\perp \quad (2)$$

The quantities on the right-hand side of equation 2 depend on $\omega_0$ and $\omega_1$. Here $\hat{n}_\perp = n_x + i n_y$ is the component of $\hat{n}$ that is transverse to $B_0$. In the time domain, the shape of the echo in the asymptotic limit is:

$$s_{asy}(t) = \iint d\omega_0 d\omega_1 f(\omega_0,\omega_1) e^{i\omega_0 t}(\hat{n} \cdot \vec{M}(0^+))\hat{n}_\perp, \quad (3)$$

where $f(\omega_0, \omega_1)$ describes the distribution of $\omega_0$ and $\omega_1$ over the sample.

In a practical implementation of a CPMG measurement, phase cycling of the initial excitation pulse is used. In its simplest implementation, the signals of two sets of CPMG measurements are subtracted from each other. In the second measurement, the phase of the excitation pulse is increased by $\pi$. This procedure eliminates various detrimental effects that can interfere with the experiment, including pulse ringing from the refocusing pulses, DC offsets in the acquisition electronics, and/or contributions from undesired coherence pathways that originate from $T_1$ recovery during the train of the refocusing cycles. Standard phase cycling inverts the transverse component of $\vec{M}(0^+)$, while leaving the longitudinal component unaffected. The resulting signal after phase cycling is:

$$s_{asy}^{(pc)}(t) = \iint d\omega_0 d\omega_1 f(\omega_0,\omega_1) e^{i\omega_0 t}(\hat{n}_\perp \cdot \vec{M}_\perp(0^+))\hat{n}_\perp. \quad (4)$$

Equations 1 through 4 provided above are general and also apply to CPMG-like sequences where the excitation and refocusing pulses are replaced by more complicated pulses, such as the phase alternating refocusing pulses described herein. For an experimental set-up with a given distribution $f(\omega_0, \omega_1)$, the amplitude of the CPMG signal is controlled by the behavior of $\vec{M}(0^+)$ and $\hat{n}$ over a range of relevant offset frequencies. The excitation pulse determines $\vec{M}(0^+)$, while the refocusing pulse determines $\hat{n}$. An ideal or perfect excitation pulse generates $\vec{M}(0^+) = \hat{x}$ over the entire ($\omega_0$, $\omega_1$) found within the sample. Similarly, an ideal refocusing pulse generates $\hat{n} = \hat{x}$ at all frequencies. According to equation 4, this is the optimal choice of the CPMG sequence with phase cycling as it optimizes ($\hat{n}_\perp \cdot \vec{M}_\perp(0^+)$). However, inspection of the more general expression in equation 3 shows that, for a given refocusing pulse, the largest asymptotic signal is obtained with an excitation pulse that maximizes ($\hat{n} \cdot \vec{M}(0^+)$) rather than ($\hat{n}_\perp \cdot \vec{M}_\perp(0^+)$). The optimal excitation pulse for CPMG applications therefore transforms $\hat{z} \to \hat{n}$. In other words, the excitation pulse generates an initial magnetization that is aligned with a refocusing axis produced by a subsequent refocusing cycle. A refocusing cycle is the duration of a refocusing pulse plus the delay between the refocusing pulse and the next pulse in a pulse sequence. In contrast, many conventional systems align the initial magnetization with the transverse plane perpendicular to $B_0$ (i.e., the z-axis), without regard for the refocusing axis produced by the refocusing pulses. Such excitation pulses are referred to herein as "axis-matching excitation pulses" or as "AMEX pulses" and are further described in U.S. Patent Application Publication No. 2013/0162247, published on Jun. 27, 2013, which is hereby incorporated by reference in its entirety. Given that $|n_\perp| \leq 1$, an ideal axis-matching pulse will generate a CPMG signal that is larger than or equal to a broadband $90°_y$ pulse that transforms $\hat{z} \to \hat{x}$. Axis-matching pulses compensate for the limitations and imperfections of refocusing pulses. Axis-matching pulses are matched to a particular refocusing axis ($\hat{n}$) and are, therefore, effective for a given refocusing pulse and echo spacing $t_E$.

Various embodiments of the present disclosure are directed to determining SNR for phase alternating refocusing pulses when used in combination with various excitation pulses. SNR with matched filtering can be determined according to the following relationship:

$$SNR = \frac{\int_{-T_{acq}/2}^{T_{acq}/2} dt |s_{asy}(t)|^2}{N_0^2}. \quad (5)$$

In equation 5, $N_0^2$ is the mean squared value of the noise, which is assumed to be additive, white, and completely uncorrelated with the signal, and $T_{acq}$ is the duration of the acquisition window. For simplicity, the static magnetic field can be characterized by a constant gradient (which results in a uniform distribution of resonant frequencies), while the oscillating RF field is uniform. In this case equation 5 can be rewritten as:

$$SNR = \frac{\int_{-\infty}^{\infty} dt |s_{asy}(t) w(t)|^2}{N_0^2} = \frac{\int_{-\infty}^{\infty} d\omega_0 |S_{asy}(\omega_0) * W(\omega_0)|^2}{N_0^2}. \quad (6)$$

In equation 6, w(t) is a "window" function that is equal to unity within the acquisition window ($|t| < T_{acq}/2$) and is zero otherwise. In addition, the Fourier transform of w(t) is denoted by $W(\omega_0) = (T_{acq}/2)\text{sinc}(\omega_0 T_{acq}/(2\pi))$, and the "*" symbol denotes convolution. The windowing operation smoothens or "blurs" frequency domain structure on scales that are smaller than $\sim 1/T_{acq}$. Parseval's theorem has also been used, which states that the power of a signal is the same in both the time and frequency domains. A similar approach can be used for more general ($\omega_0$, $\omega_1$) distributions.

The description below calculates SNR for two types of excitation pulses. The first type are perfect $90°_y$ pulses, which transfer $\hat{z} \to \hat{x}$ and thus generate $\vec{M}(0^+)=\hat{x}$ at all frequencies of interest. The second type are ideal axis-matching pulses, which transfer $\hat{z} \to \hat{n}$ and thus generate $\vec{M}(0^+)=\hat{n}$ at all frequencies of interest.

For a given refocusing pulse, the ideal axis-matching pulses will produce better results than the perfect $90°_y$ pulses. For practical axis-matching pulses, the performance lies between the perfect $90°_y$ pulses and the ideal axis-matching pulses and this is the reason for considering the two limiting cases. The resulting SNR expressions are given by:

$$SNR_{(1)} \propto \int_{-\infty}^{\infty} d\omega_0 |(n_x(\omega_0)\hat{n}_\perp(\omega_0)) * W(\omega_0)|^2, \qquad (7)$$

$$SNR_{(2)} \propto \int_{-\infty}^{\infty} d\omega_0 |\hat{n}_\perp(\omega_0) * W(\omega_0)|^2.$$

Note that one of the components of $\hat{n}$ can be chosen to be positive without loss of generality. Thus, $|n_x|$ is used in the convolutions shown in equation 7. These expressions are further simplified for refocusing cycles that are anti-symmetric about the nominal center of the echo (t=0). In such cases, the refocusing axis has no y-component ($n_y$=0). As a result, the asymptotic magnetization lies entirely along the x-axis ($\hat{n}_\perp = n_x$):

$$SNR_{(1)} \propto \int_{-\infty}^{\infty} d\omega_0 |n_x^2(\omega_0) * W(\omega_0)|^2, \qquad (8)$$

$$SNR_{(2)} \propto \int_{-\infty}^{\infty} d\omega_0 |n_x(\omega_0) * W(\omega_0)|^2.$$

Equation 8 shows that the asymptotic SNR is approximately proportional to the integral of $|n_x|^4$ for perfect 90-degree excitation pulses, and $|n_x|^2$ for axis-matching excitation pulses. However, $\hat{n}$ denotes a refocusing axis, so it follows that $|\hat{n}|=1$. Hence, $|n_x| \leq 1$ and $|n_x|^2 \leq |n_x|$ at many or all frequencies. Therefore, the SNR achievable with axis-matching is greater than or equal to that achievable with perfect 90-degree excitation. The difference in performance is particularly marked for short refocusing pulses, which tend to be "imperfect" (with $|n_x|$ substantially smaller than 1). In practice, for very short refocusing pulses, axis-matching excitation pulses were found to more than double the asymptotic SNR compared to rectangular excitation pulses.

There is usually a trade-off between the robustness with respect to offset frequency and the overall duration of refocusing pulses. In many cases, longer refocusing pulses will have better performance. However, in many applications, CPMG-like sequences are advantageous because they produce a large number of echoes. For example, it is possible to average echoes to improve the SNR if the transverse relaxation time is much longer than the echo spacing ($T_2 \gg t_E$). In this case, short echo spacings are advantageous as it allows a larger degree of averaging. As a result, the asymptotic SNR per unit time is a more relevant performance metric for CPMG-like sequences. In power units, this quantity is proportional to the SNR per echo multiplied by the rate at which echoes are generated:

$$SNR_{time} \propto \frac{SNR_{echo}}{t_E} \qquad (9)$$

In equation 9, $t_E$ is the echo period. Thus, $SNR_{time} \propto 1/t_E$ in power units. In general, longer refocusing pulses will result in longer echo periods because echoes are acquired in the gaps between echoes. In addition, the duty cycle ($t_{ref}/t_E$) of the NMR transmitter is often limited by heating, pulse droop, or for other reasons. Here $t_{ref}$ is the refocusing pulse length. Both effects tend to reduce $SNR_{time}$ as the refocusing pulse becomes longer. In this description, both SNR and $SNR_{time}$ are used as figures of merit.

The SNR can be used to optimize the phase alternating refocusing pulses described herein. In certain embodiments, SNR for several different types of refocusing pulses can be determined and the refocusing pulses with the most desirable SNR can be selected for use in an NMR tool. In various embodiments of the optimization described herein, the phase alternating pulses are defined to be piecewise constant over a number of intervals (N) each of length ($\Delta t$) which yields an overall pulse length of N$\Delta t$. During each interval, the amplitude (A) and the phase ($\varphi$) of the oscillating RF field are set to constant values, such that the pulse is described as a list $\{A_j, \varphi_j\}$, where j runs from 1 to N. The GRAPE algorithm is known in the art and can be used for optimizing such pulses. Further details regarding the GRAPE algorithm are provded in N. Khaneja, et al., Optimal Control of Coupled Spin Dynamics: Design of NMR Pulse Sequences by Gradient Ascent Algorithms, J. Magn. Reson. 172, pp. 296-305 (2005).

A number of performance optimization approaches are possible. The approach pursued in the past was based on finding universal broadband pulses. This result is achieved by maximizing average fidelity over a given bandwidth. Fidelity is a relatively sensitive measure of how well the rotation axis and nutation angle of a pulse are matched to their desired values. Maximizing the fidelity of refocusing pulses amounts to finding pulses that have simultaneously a net rotation axis along $\hat{x}$ and a net rotation angle of $\pi$. An average fidelity of one implies that a perfect $\pi$ rotation about the x-axis is achieved over the entire bandwidth of interest. In this case, any echo spacing ($t_E$) will yield identical results and the asymptotic echo amplitude will be maximized.

It is not possible to simultaneously obtain refocusing pulses with both the desired rotation axis and the rotation angle over large bandwidths. This results in solutions that form a compromise between these two desirable properties. Nonetheless, the SNR expressions shown in equations 7 and 8 reveal that, for a broadband application, performance is primarily affected by the direction of the rotation axis, not the net rotation angle. Accordingly, various embodiments of the optimization described herein focus on the direction of the axis of the effective rotation, rather than the fidelity. Such an optimization can be run by modifying the GRAPE algorithm to optimize any function of $n_\perp = n_x + i n_y$, as described in greater detail in the APPENDIX below. In particular, the integrals of $n_x^4$ or $n_x^2$ can be optimized, which maximizes SNR assuming perfect $90_y$ excitation pulses (such as the first type described above) or perfect axis-matching excitation pulses (such as the second type described above), respectively.

Various different constraints can be applied to the optimization. These constraints help reduce the parameter space and thus simplify the optimization. Some or all of the constraints described below can be used during the optimization.

In a first embodiment, the amplitudes of the segments within each phase alternating pulse can be kept constant (at $A_{max}$, the maximum allowed value). This constraint results in purely phase-modulated pulses and reduces the number of optimization variables by a factor of 2. This constraint simplifies generation of the pulse by NMR transmitter electronics, particularly in field applications where power-efficient nonlinear RF transmitters are common.

In a second embodiment, the phases of each segment can be kept symmetric with respect to the center of the refocusing pulse (e.g., central axis 302). A constant-amplitude pulse is symmetric when time-dependent phase satisfies the condition $\varphi(t)=\varphi(-t)$ for a pulse centered about $t=0$. Such pulses have performance that is independent of the sign of the resonant offset $\Delta\omega_0$. As a result, refocusing cycles that use symmetric pulses have transverse refocusing axes $n_x$ that are symmetric about $\Delta\omega_0=0$.

In a third embodiment, the phases of each segment can be kept anti-symmetric with respect to the center of the pulse (e.g., central axis 302). A pulse is anti-symmetric when time-dependent phase satisfies the condition $\varphi(t)=-\varphi(-t)$ for a pulse centered about $t=0$. This symmetry ensures that the refocusing axis is confined to the x-z plane and has no component in the y-direction. As a result, the asymptotic magnetization is real (aligned with the x-axis, with no y-component). Imposing the anti-symmetry constraint further reduces the number of optimization variables by a factor of 2.

Pulses with phases that are simultaneously symmetric and anti-symmetric with respect to time are limited to 0 and 180 degrees ($\pi$). This is because $e^{+i\pi}=e^{-i\pi}$. Such refocusing pulses have refocusing axes that satisfy the following conditions:

$$n_x(\Delta\omega_0)=+n_x(-\Delta\omega_0)$$

$$n_y=0$$

$$n_z(\Delta\omega_0)=-n_z(-\Delta\omega_0). \quad (10)$$

Because the x-component of the refocusing axis is symmetric with offset frequency ($n_x(\Delta\omega_0)=n_x(-\Delta\omega_0)$, where $\Delta\omega_0 \equiv \omega_0-\omega_{0c}$ and $\omega_{0c}$ is the nominal Larmor frequency), the asymptotic magnetization $M_{asy}$ has the same symmetry. In this case, the asymptotic time-domain echo $m_{asy}(t)$ will be purely real:

$$m_{asy}(t) = \int_{-\infty}^{\infty} M_{asy}(\Delta\omega_0)e^{j\Delta\omega_0 t}d(\Delta\omega_0) = 2\int_0^{\infty} M_{asy}(\Delta\omega_0)\cos(\Delta\omega_0 t)d(\Delta\omega_0). \quad (11)$$

The absence of an imaginary component in the time-domain echo simplifies later signal processing. These symmetries also have another practical advantage. The symmetries allow a generalized form of phase cycling, based on phase inversion of the excitation pulse, to be applied to the asymptotic magnetization produced by these pulses. The phase inversion procedure is useful for canceling ringing and static offsets, just like normal phase cycling. However, the phase inversion procedure is generally not useful for refocusing pulses that are not phase alternating. In this case, phase inversion typically cancels out a substantial fraction of the asymptotic magnetization.

The initial magnetization produced by the original and phase-inverted excitation pulse is denoted by $\vec{M}(0^+)$ and $\vec{M}^{(i)}(0^+)$, respectively. The net asymptotic signal obtained after the generalized phase cycling (the signal difference of the sequence run with the initial excitation pulse and that with the phase inverted excitation pulse) can be written as:

$$2\vec{S}_{asy}(\omega_0,\omega_1)=[\vec{M}(0^+)\cdot\hat{n}-\vec{M}^{(i)}(0^+)\cdot\hat{n}]\hat{n}_\perp. \quad (12)$$

There are different ways to impose these symmetry constraints. In some embodiments, a set of random initial phases $\{\varphi_j\}$ can be used, where j runs from 1 to N/2. The anti-symmetry constraint was imposed by optimizing the pulse $\{\varphi_j,-\varphi_{N/2-j}\}$. The length $\Delta t$ of each segment within the pulse was assumed to be constant. The symmetry constraint was imposed by adding an appropriate penalty term to the cost function used for optimization. In another embodiment, one can begin with alternating phases $\{0, \pi, 0, \pi, \ldots\}$ and optimize the switching times between them (e.g., allow for variable segment lengths $\Delta t_j$).

The additional term that imposed the symmetric pulse constraint was based on penalizing asymmetry in $n_x$ with respect to offset frequency for refocusing pulses of a fixed duration. The resulting cost function was given by:

$$C=-\frac{\sqrt{\int |n_x'(\Delta\omega_0)|^2 d(\Delta\omega_0)}+\lambda}{\sqrt{\int |n_x'(\Delta\omega_0)-n_x'(-\Delta\omega_0)|^2 d(\Delta\omega_0)}}. \quad (13)$$

In this embodiment, the effective refocusing axis $n_x'\equiv n_x*W$ can be used to take into account the effects of a finite acquisition window. The first term in the cost function is proportional to the SNR (in voltage units) of the asymptotic echo, assuming ideal axis-matching excitation pulses (such as the first type described above). In addition, $\lambda$ is a constant that controls the strength of the second term, which penalizes any asymmetry in $n_x$. An acquisition window length of $T_{acq}=5\times t_{180}$ and $\lambda=0.5$ can be used during optimizations.

Refocusing pulses were generated using optimizations with the following set of constraints:

Set 1: The fidelity of these refocusing pulses was optimized, while limiting the normalized maximum RF amplitude to $\omega_{1,max}=1$ No other constraints were placed on the amplitudes or phases of the pulse segments.

Set 2: The optimization used the asymptotic SNR for a perfect $90_y$ excitation pulse (as defined in equation 6) as the cost function. Other optimization conditions were unchanged.

Set 3: This optimization generates phase alternating pulses with anti-symmetric phases. The optimization used the asymptotic SNR for a perfect $90_y$ excitation pulse as the cost function. Also, the RF amplitude of each segment was fixed at $\omega_{1,max}=1$, thus halving the number of optimization variables. In addition, an anti-symmetric constraint was imposed on the phases of the segments by requiring that $\varphi(i)=-\varphi(-i)$, where $\varphi(i)$ is the phase of the i-th segment and $i=0$ corresponds to the center of the pulse. This constraint further halved the number of optimization variables.

Set 4: This optimization generates phase alternating pulses with both anti-symmetric and symmetric phases. The same constraints were imposed as in the Set 3. In addition, a symmetric constraint was imposed on the phases of the segments by requiring that $\varphi(i)=\varphi(-i)$, where $\varphi(i)$ is the phase of the i-th segment and $i=0$ corresponds to the center of the pulse. Also, the cost function shown in equation 13 was used to generate the pulses.

The optimization used a uniform distribution of offset frequencies between ±20$\omega_1$ and a constant oscillating RF field strength. The length of the free precession interval between adjacent refocusing pulses is represented by $t_{FP}$. The echo spacing is $t_E=t_{FP}+t_{ref}$, where $t_{ref}$ is the length of the refocusing pulse. The optimization used a segment length that was multiples of $\Delta t=0.1 \times t_{180}$, unless otherwise specified, and carried out four sets of optimizations, with the pulse length varying between $t_{180}$ and $10 \times t_{180}$ within each set, as described above.

FIGS. 6A-6D show SNR as a function of pulse length for the various refocusing pulses generated by the four sets of optimizations for uniformly-distributed resonant offsets between ±50$\omega_1$, $t_{FP}=6 \times t_{180}$, and $T_{acq}=5 \times t_{180}$. All plots have been normalized to the SNR obtained by using a perfect 90$_y$ excitation pulse and rectangular 180$_x$ refocusing pulses.

Figure 6A:
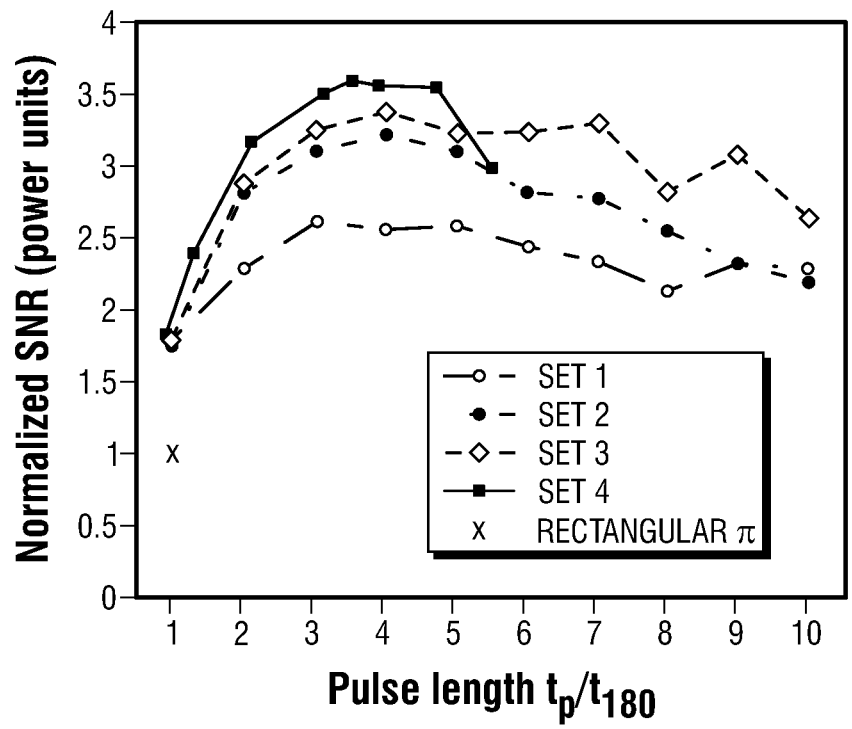
FIGS. 6A-6D show signal to noise ratio (SNR) as a function of pulse length for refocusing pulses in accordance with various embodiments of the present disclosure.
Figure 6B:
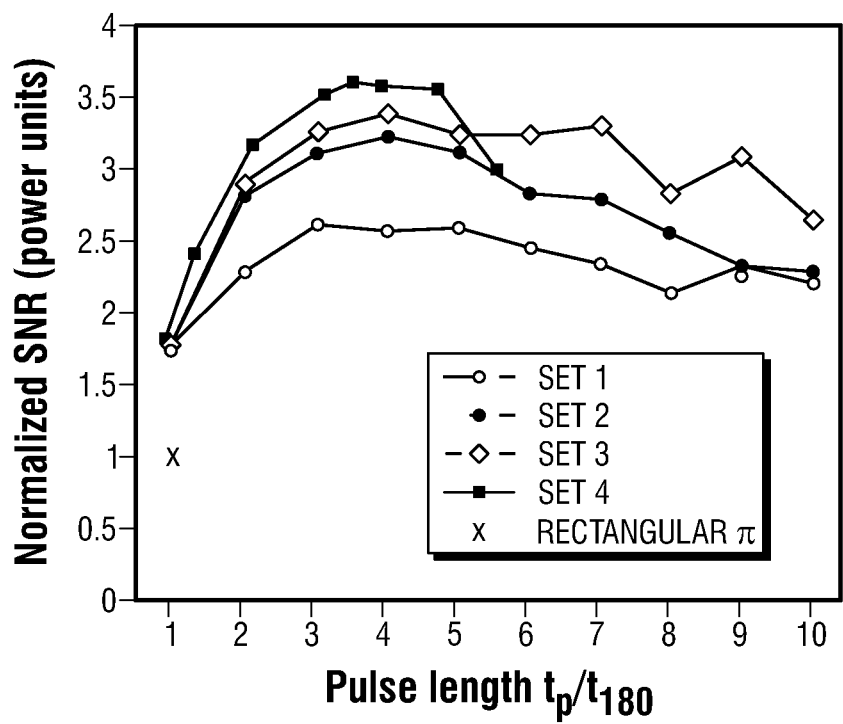

FIGS. 6A and 6B were generated using perfect 90$_y$ excitation pulses (such as the first type described above). These figures show that, for longer pulses, optimizing the refocusing axis gives significantly better results compared to optimizing for pulse fidelity. Also, the SNR for individual asymptotic echoes initially increases rapidly with pulse length and then levels off. As a consequence, the SNR per unit time shows a maximum between $t_p=3 \times t_{180}$ and $4 \times t_{180}$. Accordingly, in various embodiments, the total pulse duration of the refocusing pulses is between 3 times $t_{180}$ to 4 times $t_{180}$. This maximum shifts towards even shorter pulse lengths if the free precession time $t_{FP}$ is reduced.

Figure 6C:
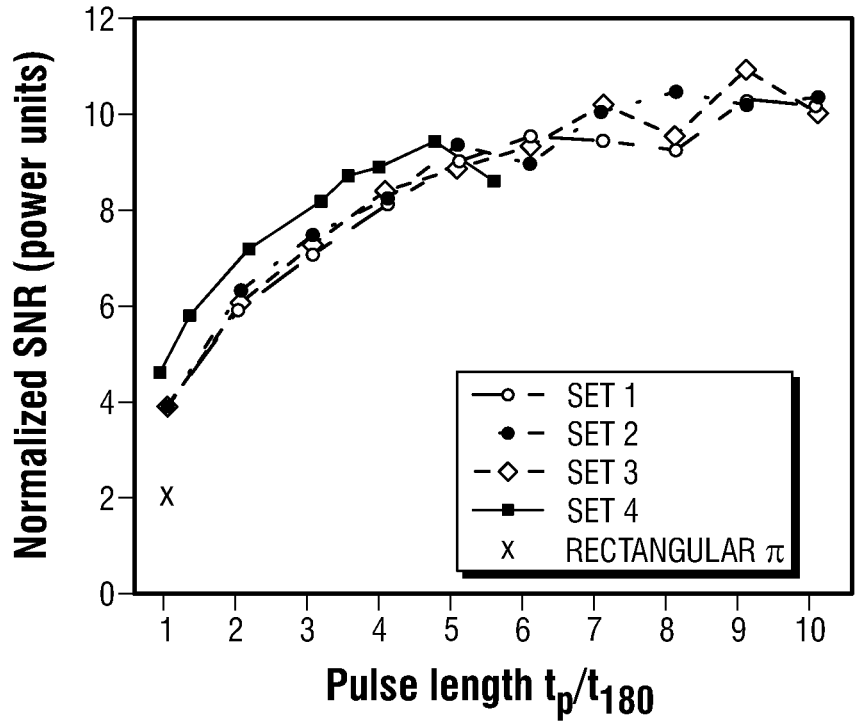
Figure 6D:
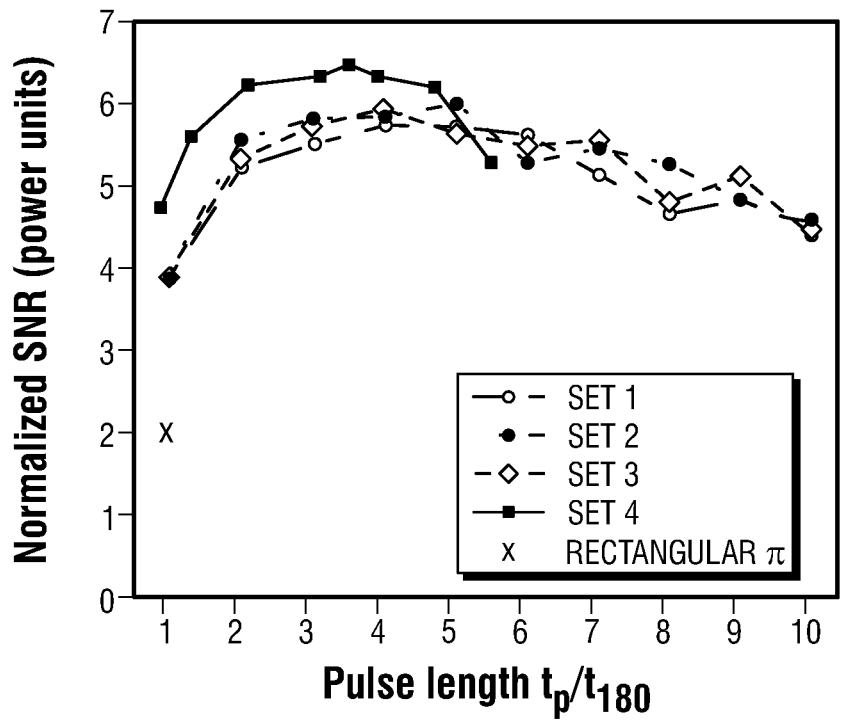

FIGS. 6C and 6D were generated using ideal axis-matching excitation pulses (such as the second type described above). The overall behavior of SNR and SNR per unit time versus pulse length is very similar to the first case, but the actual values are considerably larger, as expected. Moreover, these values converge much more slowly with simulation bandwidth than for the first case. Thus, in principle, somewhat more SNR can be obtained by increasing the simulation bandwidth. The SNR per unit time again shows a maximum between $t_p=3 \times t_{180}$ and $4 \times t_{180}$.

Figure 7A:
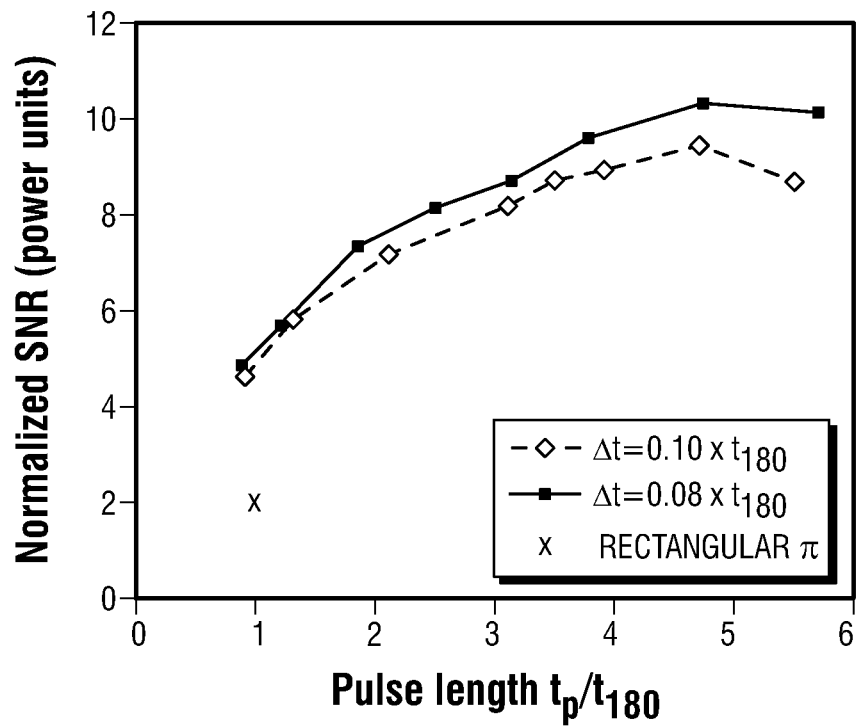
FIGS. 7A and 7B show SNR and SNR per unit time for phase alternating refocusing pulses as a function of refocusing pulse length in accordance with various embodiments of the present disclosure.
Figure 7B:
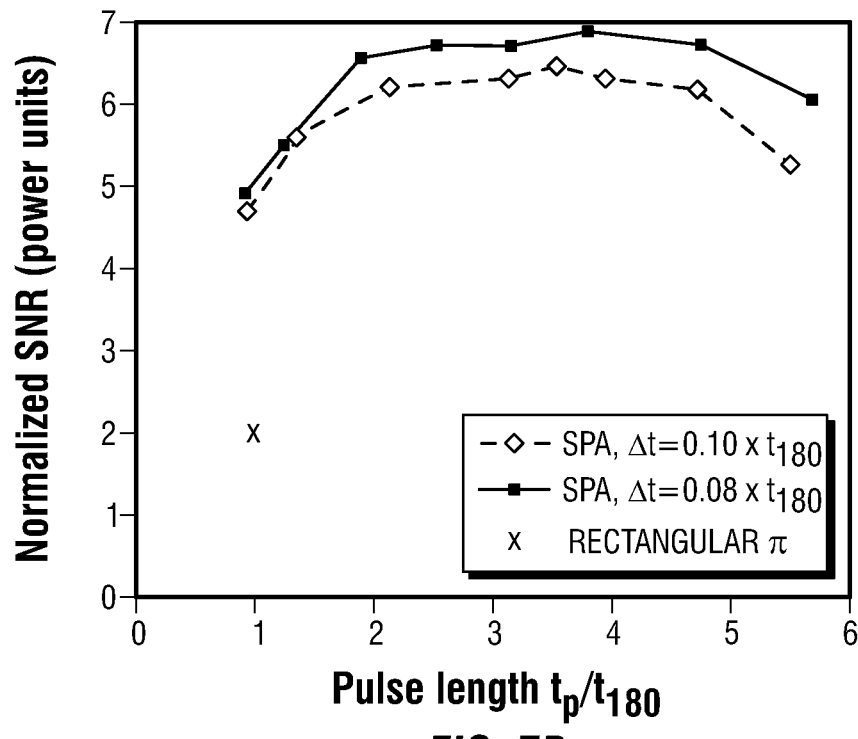

FIGS. 7A and 7B show SNR and SNR per unit time (in power units) of CPMG-like sequences using phase alternating refocusing pulses as a function of refocusing pulse length for $t_{FP}=6 \times t_{180}$. Results are shown assuming ideal axis-matching excitation pulses (type 2 described above) for two values of the minimum pulse segment length $\Delta t$. The plots have been normalized to the SNR obtained by using a perfect 90$_y$ excitation pulse and rectangular 180$_x$ refocusing pulses. As expected, the SNR increases as the control bandwidth increases, i.e., $\Delta t$ decreases. However, there is little improvement for pulses shorter than $2 \times t_{80}$. The performance of such short pulses is mainly limited by the total rotation angle $\omega_1 t_p$ and not the control bandwidth.

As explained above, the phase alternating refocusing pulses may be applied with axis-matching excitation pulses. The axis-matching pulses can be optmized for the phase alternating pulses. In one specific example, the axis-matching excitation pulses are optmized using a fixed segment length (e.g., $\Delta t=0.08 \times t_{180}$). The amplitude of each segment is constant (e.g., $\omega_{1,max}=1$) and has the same value as the refocusing pulses. The phase is allowed to take arbitrary values. The performance of the excitation pulse generally improves as the number of segments increases. This behavior occurs because longer pulses have more degrees of freedom that can be optimized, even though it is more difficult to optimize them. For example, going from 110 segments to 180 segments increases the average SNR of solutions by 15%-20%. However, the rate of improvement decreases as the pulse becomes longer than $t_E$. This is because the refocusing axis varies periodically as a function of offset frequency with a period of approximately $1/t_E$. Thus, in various embodiments, the excitation pulse is at least as long as $t_E$ in order to create initial magnetization that matches the periodicity of the refocusing axis. However, long pulses are more difficult to optimize (because they contain more optimization variables), place greater demands on the transmitter electronics, and are unsuitable for measuring small values of $T_2$ because of relaxation during the excitation pulse.

In one specific embodiment, the optimization of axis-matching excitation pulses is performed using MATLAB™'s Optimization Toolbox. In particular, MATLAB's FMINCON function can be used to minimize the cost function in equation 14, which is a weighted sum of the root-mean square (RMS) and average values of the asymptotic signal $S_{asy}(\Delta\omega_0)=(\hat{n} \cdot \vec{M}(0^+))\hat{n}_\perp$:

$$C=-[\sqrt{\int S_{asy}^2(\Delta\omega_0)d(\Delta\omega_0)}+\lambda \int S_{asy}(\Delta\omega_0)d(\Delta\omega_0)]. \quad (14)$$

In equation 14, $\Delta\omega_0$ is the resonance offset frequency, $\lambda$ is a real number that controls the strength of the second term in the cost function, and $S_{asy}(\Delta\omega_0)$ is purely real (along the x-axis) because $n_y=0$ for phase alternating refocusing pulses. The first term is proportional to the asymptotic SNR in voltage units. The second term is proportional to $S_{asy}(0)$, the signal amplitude at the nominal center (t=0) of the time-domain echo. This is because Fourier analysis shows that $S_{asy}(0)=\int S_{asy}(\Delta\omega_0)d(\Delta\omega_0)$. This term allows the optimizer to find better (higher SNR) solutions. $\lambda=0.33$ can be used, which results in roughly equal weights being assigned to the two terms in the cost function. Also, an acquisition window length of $T_{acq}=5 \times t_{180}$ can be used in the optimization. Further details regarding axis-matching excitation pulses and optimization are described in U.S. Patent Application Publication No. 2013/0162247, published on Jun. 27, 2013, and S. Mandal et al., Axis-Matching Excitation Pulses for CPMG-like Sequences in Inhomogeneous Fields, Journal of Magnetic Resonance, 237:1-10 (2013).

TABLE 1

Figure 4B:
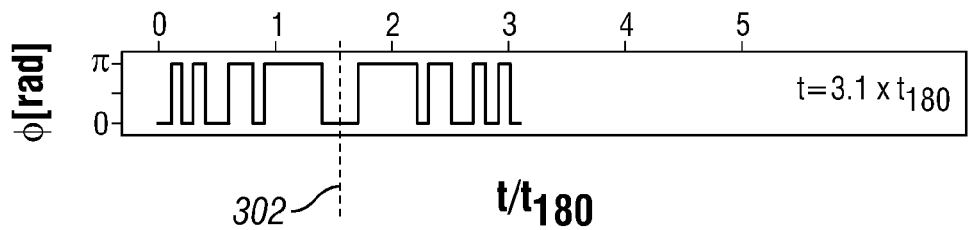

| Sequence # | Excitation pulse | Excitation pulse length [$t_{180}$] | Refocusing pulse | Refocusing pulse length [$t_{180}$] | SNR (predicted) | SNR per unit time (predicted) |
|---|---|---|---|---|---|---|
| 1 | AMEX | 14.4 | From FIG. 4A | 2.1 | 4.65 | 4.02 |
| 2 | AMEX | 14.4 | From FIG. 4A | 2.1 | 4.78 | 4.13 |
| 3 | AMEX | 14.4 | From FIG. 4B | 3.1 | 5.07 | 3.90 |

Table 1 shows predicted SNR and SNR per unit time for NMR pulses seqeuences with a practical axis-matching excitation pulse and phase alternating pulses, as shown in FIGS. 4A and 4B ("AMEX-PA sequences"). The phase alternating pulses include a free precession interval of $t_{FP}=6 \times t_{180}$. The axis-matching exitation pulses were generated by constraining the optimization to excitation pulses with 180 segments (total length=14.4$\times t_{180}$) Excitation pulses of this length provide a compromise between pulse length, SNR, and practical concerns for values of $t_E$ between $7 \times t_{180}$ and $9 \times t_{180}$. The results in Table 1 have been normalized to a standard CPMG sequence (using rectangular 90 degree and 180 degree pulses). The new sequences provide greater SNR than the standard CPMG sequence. For example, consider phase alternating refocusing pulses of length $2 \times t_{180}$. The second AMEX-PA sequence listed in Table 1 is predicted to produce 4.78 times the SNR (in power units) within a single asymptotic echo than the standard CPMG with rectangular excitation and refocusing pulses. After accounting for the increased echo period relative to the normal CPMG, which has $t_E = 7 \times t_{180}$ the normalized SNR per unit time in this case is 4.13.

Figure 8A:
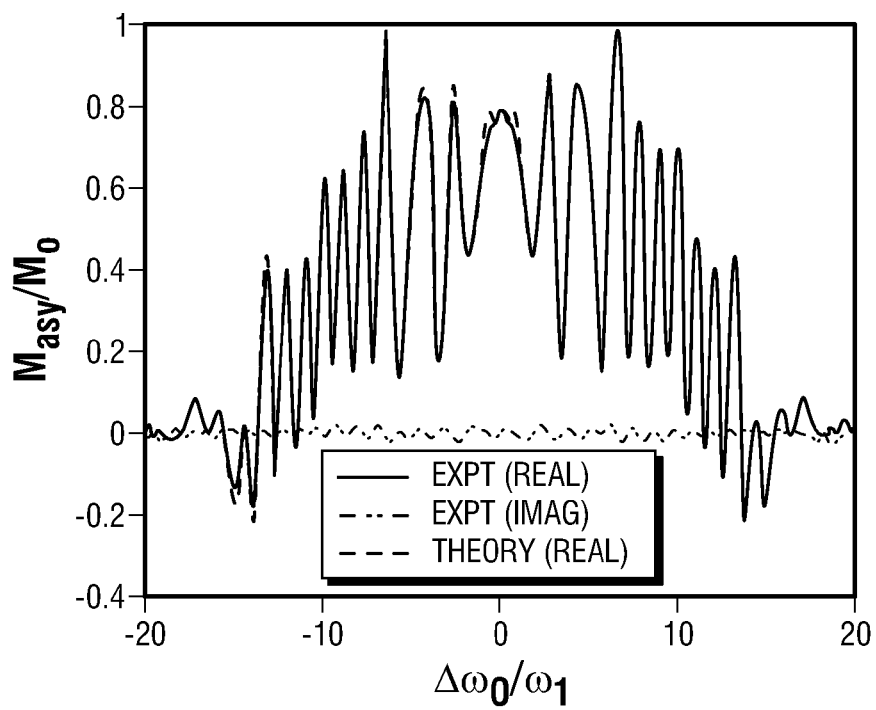
FIGS. 8A-8C show an experimentally measured spectrum of asymptotic echoes produced by NMR sequences in accordance with various embodiments of the present disclosure.
Figure 8B:
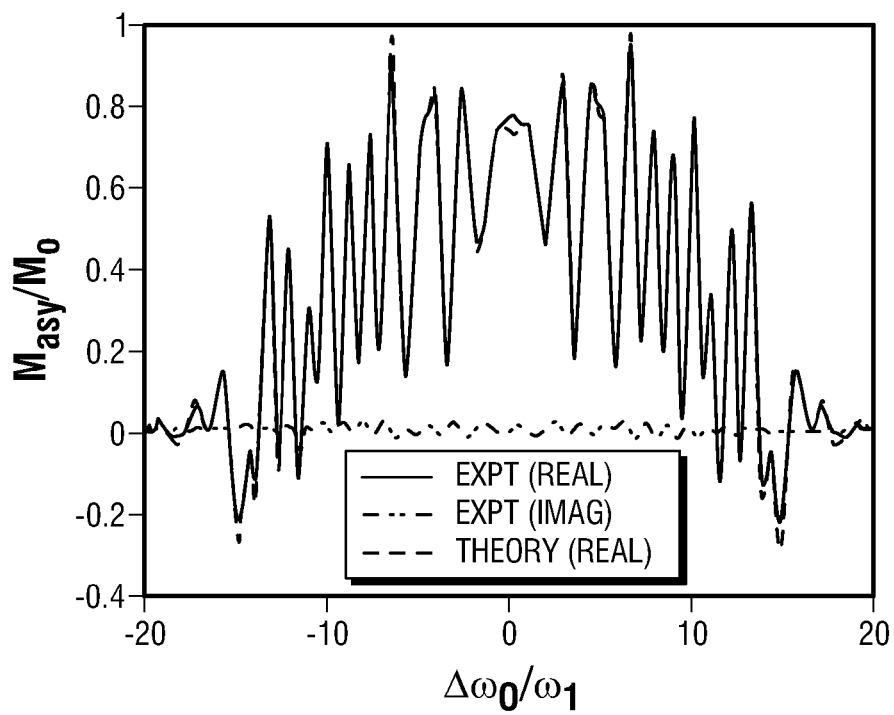
Figure 8C:
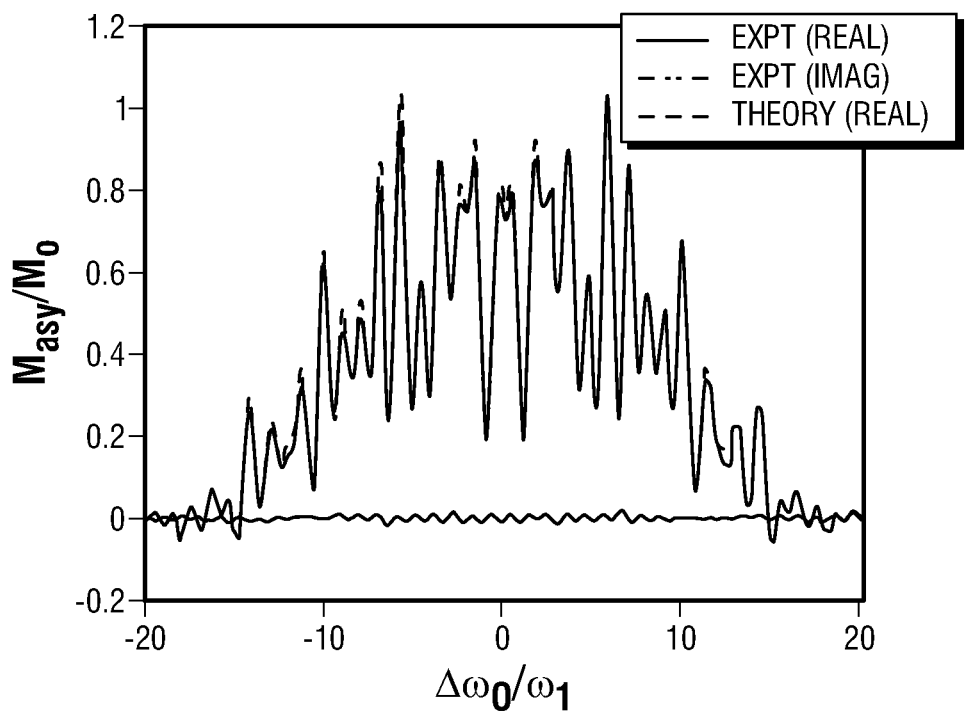

The three different AMEX-PA sequences listed in Table 1 were evaluated using an NMR system. FIGS. 8A-8C show an experimentally measured spectrum of the asymptotic echo produced by sequences 1-3, respectively, and the figures compare the experimentally measured spectrum with the theoretically predicted spectrum. The match between theory and experiment is excellent for the three sequences shown in the figure.

Figure 9:
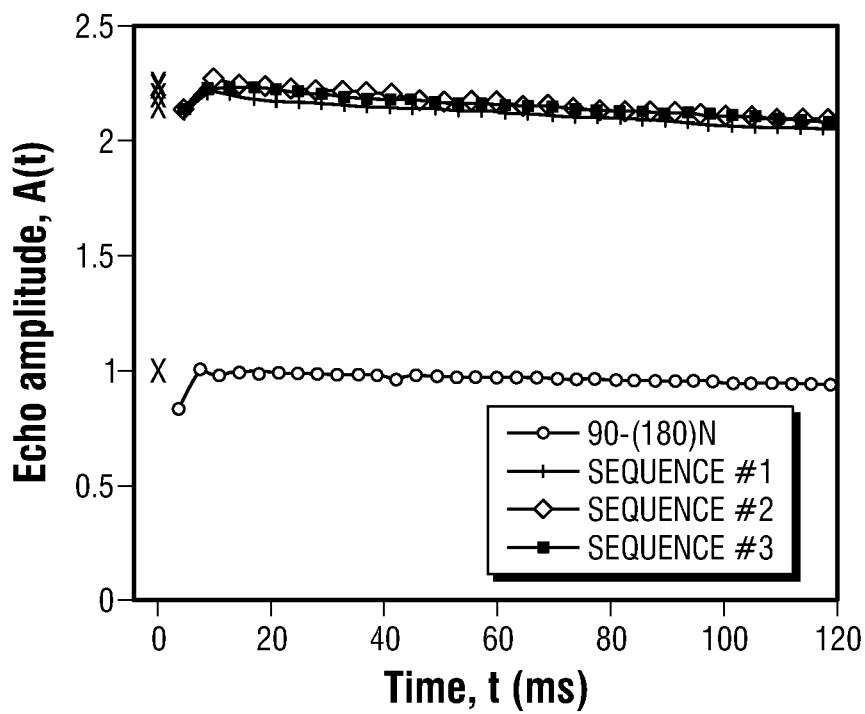
FIG. 9 shows measured amplitudes of echoes produced by NMR sequences in accordance with various embodiments of the present disclosure.

FIGS. 8A-8C compare the measured echo amplitude decay of the AMEX-PA sequences in Table 1 with the standard CPMG sequence $90_y$–$(180_x)^N$. In these figures, a free precession interval of $t_{FP} = 6 \times t_{180}$ was used and phase corrections have been applied to the experimental spectra (both constant and first-order, i.e., varying linearly with offset frequency). Referring to FIG. 9, echo amplitudes were calculated by using the measured asymptotic echo shape as a matched filter. This procedure can be used for processing data when the noise is additive, white, and exhibits Gaussian statistics. In each case, after the first few echoes, the echo amplitudes enter the asymptotic regime where they follow an exponential decay $A(0) \exp(-kt_E/T_2)$ with $T_2 = 2.00$ sec and k being the echo number. For each sequence, the value of $A(0)$ is marked by a x sign. $A(0)$ is the amplitude extrapolated to $t = 0$ after exponential fitting. The amplitudes were normalized with respect to $A(0)$ of the standard CPMG sequence.

FIG. 9 shows measured amplitudes of the echoes for the three different AMEX-PA sequences during the first 120 ms. The echo amplitudes were extracted using the normalized asymptotic echo shapes as matched filters. The x symbols show the amplitudes extrapolated to $t = 0$, which were obtained by fitting exponential decays to the asymptotic regimes. FIG. 9 also shows that the AMEX-PA sequences have a characteristic transient effect in the first few echoes that is analogous to that observed for the standard CPMG sequence in inhomogeneous magnetic fields. This CP-like component is generated by initial magnetization that is not aligned with the CPMG refocusing axis. FIG. 9 shows that the normalized amplitude of this initial transient is significantly smaller for the AMEX-PA sequences in Table 1. This shows that the sequences place more of the initial magnetization along the CPMG refocusing axis than the standard CPMG sequence.

FIGS. 8A-8C and 9 were generated from a NMR experiment performed using the following NMR system, parameters, and sample. The NMR system was a small-animal imaging probe located within a 1 T superconducting magnet. The sample for the experiment was deionized (DI) water that was placed within a NMR tube with a diameter of 10 mm and length of 23 cm aligned along the z-axis. A set of gradient coils was used to create a constant $B_0$ gradient along the z-axis. The gradient coils produced a uniform distribution of resonant offset frequencies within the sample (a gradient $g = 1.6$ G/cm). This value of gradient minimizes diffusion effects. In addition, to evaluate the shapes of the echoes in detail, a low power level for the refocusing pulses was used, resulting in a nominal 180° rectangular pulse length of $t_{180} = 500$ μs. As a result, the characteristic length of the refocused region was $\omega_1/(\gamma g) = 1.50$ mm (much shorter than the sample). The acquisition window length $T_{acq} = 2.048$ ms $= 4.10 \times t_{180}$ was long enough to ensure that the entire echo shape could be recorded for analysis. Other experimental parameters included $t_{FP} = 6 \times t_{180}$ and a recycle delay $t_R = 8$ sec. A standard eight-part phase cycle was used for the standard CPMG sequence using rectangular excitation and refocusing pulses, while a two-part phase-inversion cycle was used for the AMEX-PA sequences listed in Table 1. Given the quality factor of the coil, the transmit and detection bandwidth was about 1 MHz (three orders of magnitudes larger than $\omega_1/(2\pi)$), and therefore not a limiting factor.

Figure 10:
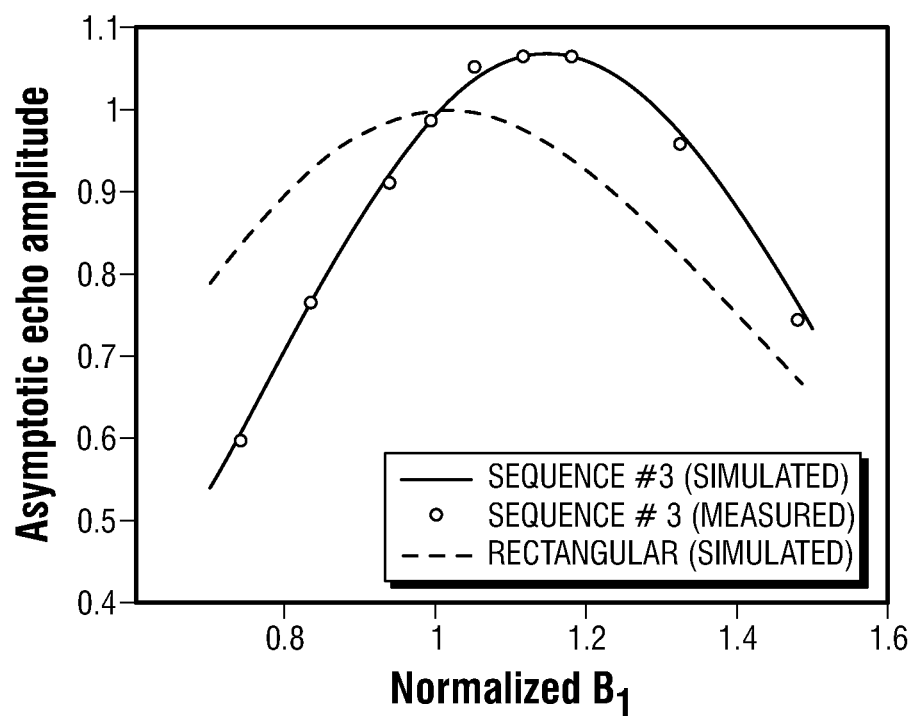
FIG. 10 shows measured and simulated nutation curves for NMR sequences in accordance with various embodiments of the present disclosure.

The sensitivity of a given NMR sequence to changes in the static field $B_1$ can be evaluated by plotting a corresponding nutation curve. The nutation curve is defined as the asymptotic echo amplitude as a function of $B_1$ field strength. FIG. 10 shows measured and simulated nutation curves for the third AMEX-PA sequence listed in Table 1 and the standard CPMG sequence (rectangular 90 degree excitation and 180 degree refocusing pulses). FIG. 10 shows that the overall shapes of the nutation curves for the sequences are similar. In particular, the curves have comparable sensitivities to changes in the $B_1$ field. However, for the third AMEX-PA sequence in Table 1, SNR is maximized when $B_1$ is approximately 15% larger than its nominal value, while, for the rectangular sequence, SNR is maximized when $B_1$ is equal to its nominal value. As a result, the SNR produced by the AMEX-PA sequence increases by up to 15% (in power units) as $B_1$ becomes larger than its nominal value, while that of the rectangular sequence decreases. The other AMEX-PA sequences in Table 1 show similar behavior.

TABLE 2

| Sequence # | Predicted SNR | Measured SNR | Predicted SNR per unit time | Measured SNR per unit time |
|---|---|---|---|---|
| 1 | 4.65 | 4.39 | 4.02 | 3.79 |
| 2 | 4.78 | 4.56 | 4.13 | 3.94 |
| 3 | 5.07 | 4.63 | 3.90 | 3.56 |

Table 2 shows the predicted and measured SNR for the three different AMEX-PA sequences in Table 1. The values shown in the Table 2 have been normalized with respect to the standard CPMG sequence. Each experimental SNR value is given by $A(0)^2$, where $A(0)$ is the amplitude of the corresponding echo decay extrapolated to $t = 0$. The resultant agreement between theory and application is excellent, with an average error of 6.3% between them.

Figure 11:
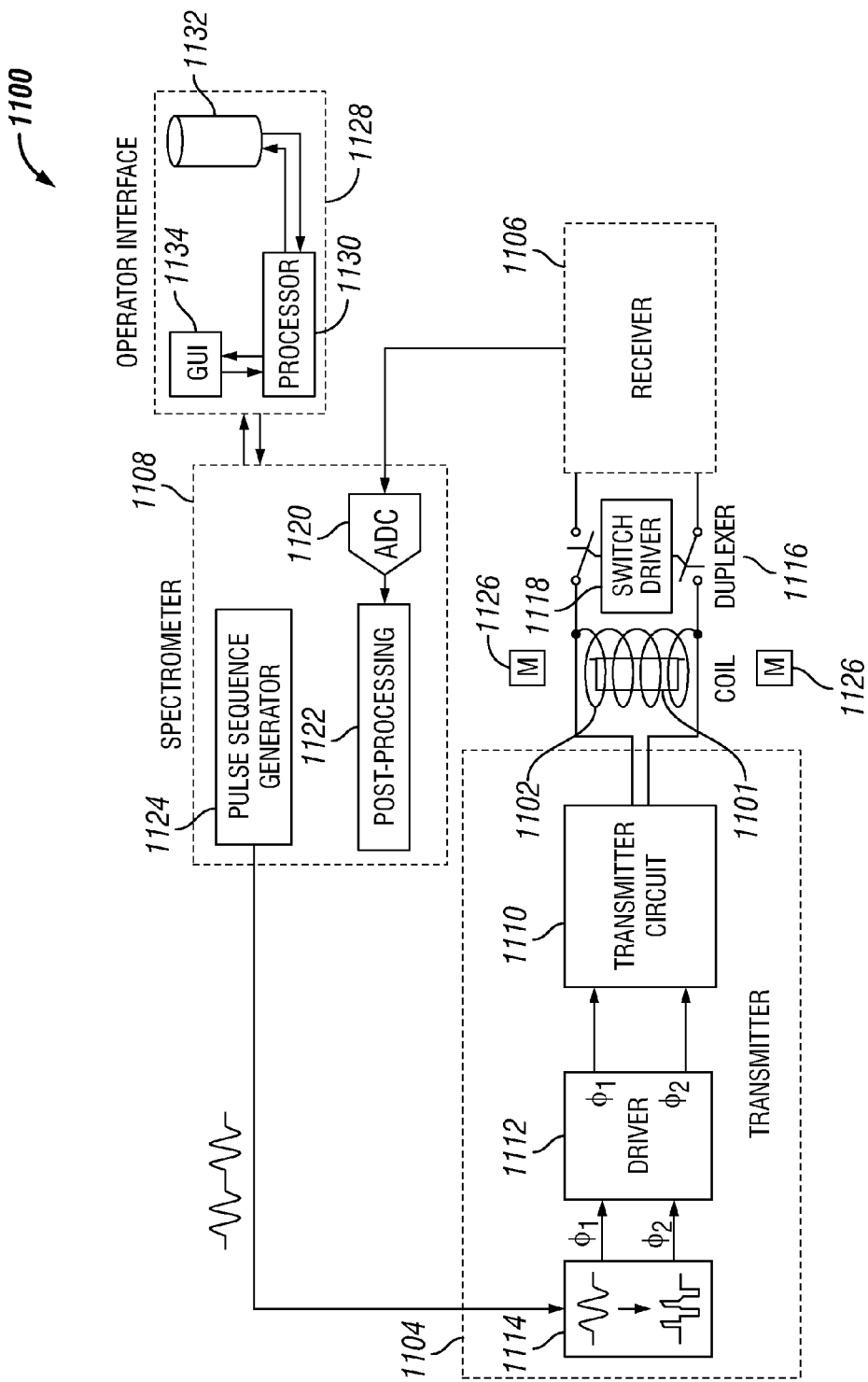
FIG. 11 shows a NMR system in accordance with one embodiment of the present disclosure.

FIG. 11 shows a NMR system 1100 in accordance with one embodiment of the present disclosure. This NMR system 1100 can be used to apply the phase alternating refocusing pulses described above. The NMR system 1100 includes a coil 1102 that is coupled to NMR electronics 1104, 1106, 1108. A sample substance 1101 is located inside and/or outside of the coil 1102. The coil 1102 applies RF pulses and NMR pulse sequences to the substance 1101. The NMR electronics include a transmitter 1104 and a receiver 1106. Each of the transmitter 1104 and the receiver 1106 are coupled to the coil 1102. In some embodiments, however, the NMR system 1100 may include separate transmitter and receiver coils.

The NMR transmitter 1104 includes a NMR transmitter circuit 1110 that is coupled to the coil 1102. The transmitter circuit 1110 generates NMR pulse sequences and provides the NMR pulse sequences to the coil 1102. In some embodiments, the NMR transmitter 1104 uses a "tuned" NMR transmitter circuit 1110. A tuned NMR transmitter is tuned to a particular Larmor frequency using a capacitor that is coupled to the coil. The particular capacitance of the capacitor and the inductance of the coil determine the resonant frequency that is generated by the coil. In other embodiments, the transmitter circuit 1110 is a "non-resonant" transmitter circuit. The circuit is non-resonant because the resonant frequency of the circuit does not need to match the Larmor frequency of interest. Although the non-resonant transmitter circuit and coil 1102 may use capacitors and have some associated capacitance, this capacitance is not specifically selected to match a Larmor frequency of interest. Instead, the transmitter circuit includes a plurality of switches that couple and decouple the coil 1102 with a power source. Operation of the switches generates a particular frequency. Thus, the frequency produced by the transmitter circuit can be modulated directly by a spectrometer. Further details regarding non-resonant transmitters are provided in U.S. Publication No. 2012/0001629 published on Jan. 5, 2012; U.S. application Ser. No. 13/774,457, filed on Feb. 22, 2013, and U.S. patent application Ser. No. 13/963,826, filed on Aug. 9, 2013. These patent applications are incorporated by reference in their entireties.

As shown in FIG. 11, the coil 1102 is also coupled to a NMR receiver 1106 so that NMR resonant signals that are generated within the substance 1101 can be detected, amplified, and analyzed. In one specific embodiment, the receiver 1106 is a broadband NMR receiver, which can receive and process resonant NMR signals over a broad frequency range. The coil 1102 is coupled to the receiver 1106 using a duplexer 1116. The duplexer 1116 decouples the receiver 1106 from the coil 1102 when the coil is operating in a transmitting mode (e.g., transmitting an NMR pulse sequence). In one particular embodiment, the duplexer 1116 includes switches and a switch driver 1118 that opens the switches during a transmitting mode and closes the switches during a receiving mode of operation. In this manner, the duplexer 1116 protects the receiver 1106 during a transmitting mode. A duplexer may not be used when the NMR system 1100 includes separate transmit and receive coils.

The NMR system 1100 also includes a spectrometer 1108 that is used to provide NMR pulse sequences to the NMR transmitter 1104 and to analyze the NMR signal received from the NMR receiver 1106. In various embodiments, the detected NMR signal is output by the NMR receiver 106 in analog form. In such embodiments, the spectrometer 1108 may include a digitizer 1120 (e.g., analog-to-digital converter) for converting the detected NMR signal into digital data. Furthermore, in various embodiments, demodulation of the NMR signal can occur within the spectrometer 1108. In various other embodiments, however, demodulation of the NMR signal can also occur within the NMR receiver 1106. The spectrometer 1108 also includes a post-processor 1122 that is used to interpret the detected digital NMR data and to determine NMR properties from the detected data. This data can be presented to a user using an operator interface with a graphical user interface (GUI). The spectrometer 1108 also includes a pulse sequence generator 1124 that generates NMR pulse sequences based upon parameters selected by an operator at the operator interface. The pulse sequence generator provides the sequences to the NMR transmitter 1104. In one particular embodiment, the spectrometer 1108 is a KEA, which can be obtained from Magritek of Wellington, NZ. The spectrometer 1108 can be controlled from the operator interface using PROSPA™ software, which can also be obtained from Magritek.

Further details of NMR electronics, NMR transmitters, and NMR receivers are described in U.S. Publication No. 2012/0001629, published on Jan. 5, 2012, and U.S. application Ser. No. 13/774,457, filed on Feb. 22, 2013. These patent applications are incorporated by reference in their entireties.

As shown in FIG. 11, the NMR system 1100 includes an electro-magnetic device 1126 for applying a static magnetic field to the substance 1101. In some embodiments, the electro-magnetic device 1126 is a magnet or an array of magnets. The magnets can be formed from a samarium-cobalt (SmCo) magnetic material.

The NMR system 1100 also includes an operator interface 1128 for communicating with the spectrometer 1108. The operator interface 1128 includes a computer system. The computer system may include a computer processor 1130 (e.g., a microprocessor, microcontroller, digital signal processor, or general purpose computer) for executing any of the methods and processes described herein. The computer system may further include a memory 1132 such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCM-CIA card), or other memory device. The memory 1132 can be used to store computer instructions (e.g., computer program code) that are interpreted and executed by the processor 1130.

NMR pulse sequences may be implemented as a series of computer instructions (e.g., software or firmware) fixed on a non-transitory tangible medium, such as a computer readable medium (e.g., a memory), or transmittable to the computer system, via a modem or other interface device, such as a communications adapter connected to a network over a tangible medium (e.g., optical or analog communications lines). The series of computer instructions can embody all or part of the NMR pulse sequences and phase alternating refocusing pulses described herein. The processor 1130 may be configured to retrieve the sequences from the memory 132 and provide instructions to the NMR electronics 1104, 1106, 1108 to apply the sequences to the substance 1101. The detected resonant signals may also be communicated from the NMR electronics 1104, 1106, 1108 to the processor 1130 for storage on the memory 1132.

The operator interface 1128 also supports the graphical user interface 1134 (GUI) (e.g., a monitor, a touch screen, a mouse, a keyboard and/or a joystick). The GUI 1134 allows an operator to control and communicate with the NMR electronics 1104, 1106, 1108. In various embodiments, the operator interface 1128 can be used to perform functions selected from the following non-limiting list:

Communicate NMR pulse sequences from the operator interface 1128 to the NMR electronics 1104, 106, 108;

Communicate instructions to the NMR electronics 1104, 1106, 1108 to initiate and/or terminate NMR measurements;

Communicate instructions to change parameters of NMR pulse sequences to the NMR electronics 1104, 1106, 1108 (e.g., pulse amplitude of sequences, pulse lengths, timing between pulses, shape of pulses, and/or frequency of pulses);

Communicate detected NMR signal data from the NMR electronics 1104, 1106, 1108 to the operator interface 1128;

Perform analysis at the operator interface 1128 of detected NMR signal data to determine NMR properties of substances; and Display various plots of NMR properties to the operator at the operator interface 128.

Illustrative embodiments of the present disclosure are not limited to the NMR system 1100 shown in FIG. 11. Various modifications can be made to the system. For example, in one specific embodiment, the NMR electronics 1104, 1106, 1108 include an additional computer system that supports the NMR electronics. In such an embodiment, the NMR electronics 1104, 1106, 1108 and operator interface 1128 may include their own communication modules, which provide for communication between the NMR electronics and the operator interface. A communications link between the communication modules can be established using, for example, a hard-wired link, an optical link, acoustic link, and/or a wireless link. By using the communication modules, the NMR electronics 1104, 1106, 1108 and the operator interface 1128 can be physically located in two separate locations. For example, in a wellbore application, the NMR electronics 1104, 1106, 1108 can be located downhole, while the operator interface 1128 is located at the surface.

Figure 12:
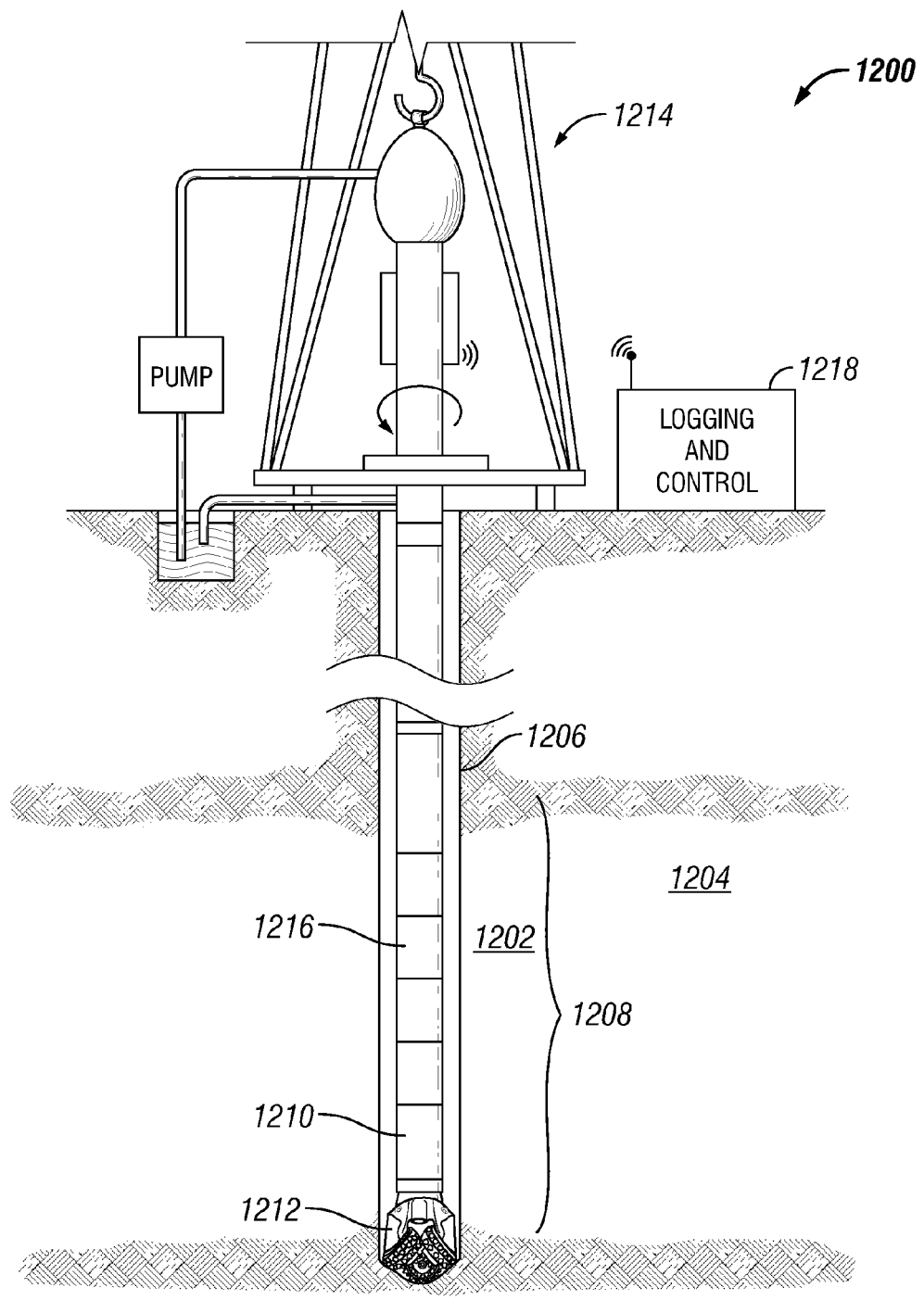
FIG. 12 shows a logging-while-drilling (LWD) system in accordance with one embodiment of the present disclosure.

Illustrative embodiments of the present disclosure are further directed to oil and gas field applications, such as wellbore logging tools. In particular, FIG. 12 shows a logging-while-drilling (LWD) system 1200 for investigating, in situ, a substance 1202 within an earth formation 1204 and determining a property of the substance, while a drilling operation is performed. The LWD system 1200 includes a drill string 1208 that is disposed within a wellbore 1206 that traverses the formation 1204. The drill string 1208 includes a drill collar 1210 with a drill bit 1212 disposed at the lower-end of the drill collar. The LWD system 1200 also includes a surface system with a derrick assembly and platform assembly 1214 positioned over the wellbore 1206. The derrick assembly 1214 rotates the drill string 1208 and, as the drill string rotates, the drill bit 1212 drills deeper into the wellbore 1206. An LWD NMR logging module 1216 is disposed within the drill collar 1210 so that the module can log the surrounding earth formation as the drilling operation is performed. The logging module 1216 communicates with surface equipment 1218, which includes an operator interface for communicating with the module. Such an operator interface has already been described with reference to FIG. 11. In various embodiments, the NMR logging module 1216 and operator interface can communicate via any one of a wired-drill pipe connection, an acoustic telemetry connection, optical communication and/or electronic communication.

Figure 13:
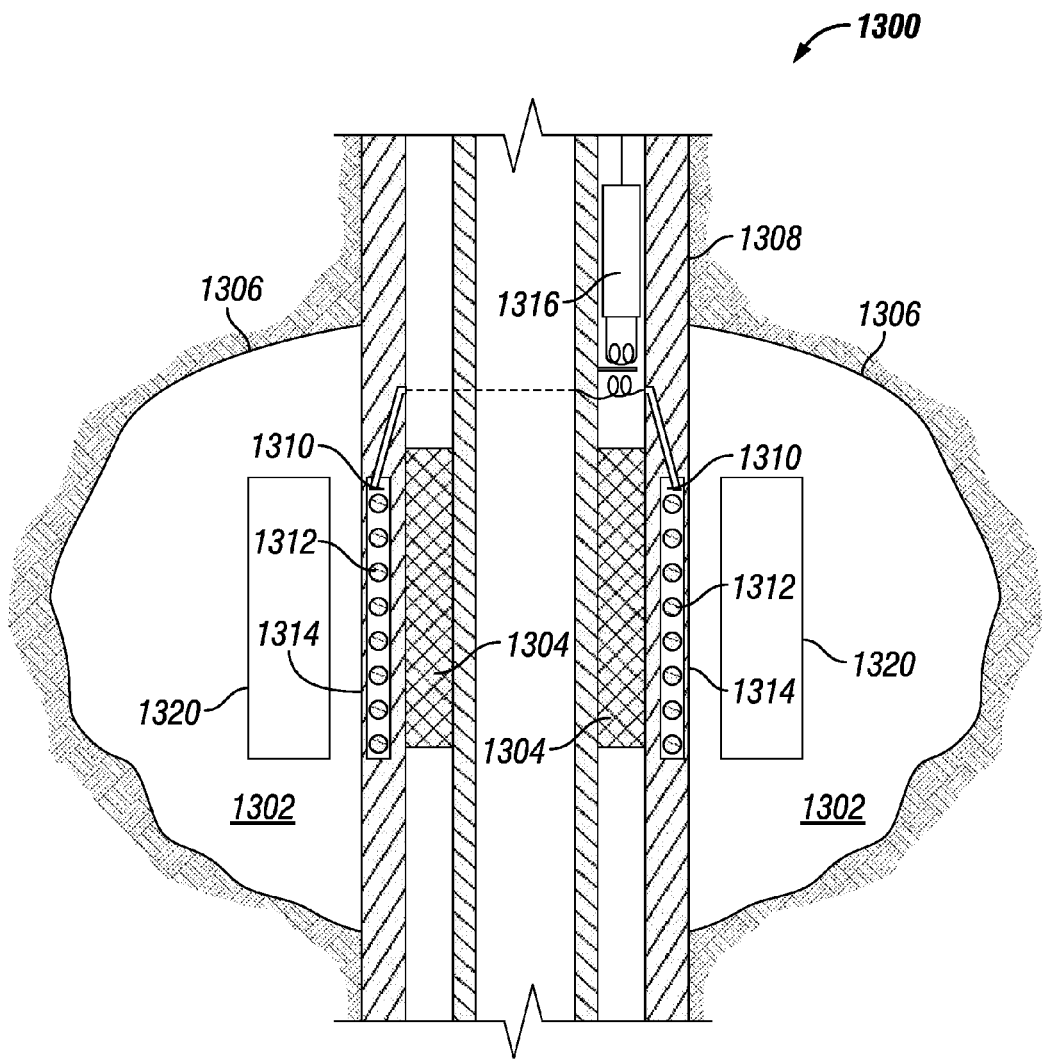
FIG. 13 shows a LWD NMR logging module in accordance with one embodiment of the present disclosure.

FIG. 13 shows an LWD NMR logging module 1300 for applying NMR pulse sequences to the formation. The module 1300 includes magnet sections 1304 that generate a static magnetic field within a zone of sensitivity 1306 within the formation 1302. The static magnetic field produced by the magnet section 1304 and applied to the formation 1302 is inhomogeneous because the field decreases in strength as a function of distance from the magnet and into the formation. The module 1300 also includes a drill collar 1308 with an axial slot 1310. A coil 1312 is disposed within the axial slot 1310 and the slot is filled with an insulator, such as ceramic, epoxy, or fiberglass. The coil 1312 is wound around the drill collar 1308 within the axial slot 1310. The axial slot 1310 is sealed using a cover 1314. In some embodiments, the cover 1314 is formed from a non-magnetic material and/or non-conductive material. At one end, the coil 1312 is grounded (e.g., to the drill collar 1308). At the other end, the coil 1312 is coupled to NMR electronics 1316, which include a transmitter and a receiver. The NMR electronics 1316 are coupled to the coil 1312 via, for example, pressure feedthroughs.

The coil 1312 applies an oscillating magnetic field to an area of interest 1320 within the zone of sensitivity 1306 of the formation 1302. In some embodiments, the oscillating magnetic field is axially symmetric to facilitate measurements during rotation of the drill string. The oscillating magnetic field is applied as a NMR pulse sequence, such as a CPMG sequence. The NMR pulse sequence includes phase alternating refocusing pulses as described herein to increase the SNR of resonant signals produced within the inhomogeneous static magnetic field applied by the magnet sections 1304, while also meeting the power constraints of an LWD tool application.

The coil 1312 also detects an NMR signal produced by the oscillating magnetic field within the formation. The NMR signal can be used to determine properties of the formation, such as a porosity of the formation and/or a bulk diffusion coefficient of formation fluids within the formation. Further details of NMR LWD systems are described in U.S. Pat. No. 5,629,623 issued on May 13, 1997 and U.S. Pat. No. 6,392,410, issued on May 21, 2002. Each of these patents is incorporated by reference herein in their entireties. One specific example of a NMR LWD tool is Schlumberger's proVISION™ tool.

The NMR methods and pulses sequences described herein are not limited to any particular device type or system. The NMR methods and pulses sequences described herein can be implemented in surface environments, such as in a laboratory. The NMR methods and pulses sequences described herein can be used in single-sided NMR systems, stray-field NMR systems, or in any other NMR applications where an inhomogenous static magnetic field are used.

The NMR methods and pulses sequences described herein are not limited to any particular wellbore application. The NMR methods and pulses sequences described herein can be used with LWD systems, such as the one shown in FIGS. 12 and 13. Also, the NMR methods and pulses sequences described herein can be applied to wireline systems (e.g., a wireline tool) or measuring-while-drilling systems (e.g., MWD tools). Illustrative embodiments can also be used with any suitable means of conveyance, such as armored cable or coiled tubing.

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

APPENDIX

The unitary operator that performs a counter-clockwise rotation of angle $\theta$ around an axis $\hat{n}$, where $\hat{n}$ is a unit vector, has the form:

$$U(\theta, \hat{n}) = e^{-i\frac{\theta}{2}\hat{n}\cdot\sigma}, \tag{15}$$

Given U, $\hat{n}$ up to a sign can be determined. To avoid ambiguity, the constraint $n_x \geq 0$ is imposed.

Following the GRAPE approach described by Khaneja et al., Optimal Control of Coupled Spin Dynamics: Design of NMR Pulse Sequences by Gradient Ascent Algorithms, J. Magnetic Resonance, 172:296-305 (2005), the gradient of $n_\perp = n_x + i n_y$ can be analytically calculated with respect to the controls to the first order and used to maximize any function of $n_\perp$.

The Hamiltonian of the spin system is $$H(t) = H_0 + \sum_{k=1}^{2} u_k(t) H_k, \quad (16)$$

where $H_0$ is the natural Hamiltonian, which is $-\Delta\omega_0 I_z$ and $H_k$ represents the control functions, which are $I_x$ and $I_y$.

Denote the evolution due to free precession as $U_0$. If the controls are discretized in N small time steps and the controls are assumed constant in each time step $\Delta t$, then:

$$U = U_0 U_N \ldots U_j \ldots U_1 U_0, \quad (17)$$

where $U_j = \exp(-i\Delta t(H_o + \Sigma_{k=1}^{2} u_k(j) H_k))$. If the control $u_k(j)$ is perturbed by a small amount $\delta u_k(j)$, the resulting small change in $U_j$ to first order in $\delta u_k(j)$ is $$\delta U_j = -i\Delta t H_k U_j \delta u_k(j). \quad (18)$$

Therefore, to first order, the change in the total unitary operator is $$\delta U = \underline{U_0 U_N \ldots (-i\Delta t) H_k U_j \ldots U_1 U_0} \delta u_k(j) \quad (19)$$
$$= \tilde{U} \delta u_k(j).$$

U in explicit matrix representation is:

$$U = e^{-i\frac{\theta}{2}\hat{n}\cdot\sigma} \quad (20)$$
$$= I\cos\left(\frac{\theta}{2}\right) + i\sin\left(\frac{\theta}{2}\right)\hat{n}\cdot\sigma$$
$$= \begin{bmatrix} \cos\left(\frac{\theta}{2}\right) + i\sin\left(\frac{\theta}{2}\right)n_z & \sin\left(\frac{\theta}{2}\right)n_y - i\sin\left(\frac{\theta}{2}\right)n_x \\ -\sin\left(\frac{\theta}{2}\right)n_y - i\sin\left(\frac{\theta}{2}\right)n_x & \cos\left(\frac{\theta}{2}\right) - i\sin\left(\frac{\theta}{2}\right)n_z \end{bmatrix}.$$

Hence, $n_x$ and $n_y$ can be found from U. Taking into account the constraint that $n_x \geq 0$ provides:

$$n_x = \sqrt{\frac{\Im^2(U_{12})}{1 - \Re^2(U_{11})}}, \quad n_y = \pm\sqrt{\frac{\Re^2(U_{12})}{1 - \Re^2(U_{11})}}. \quad (21)$$

The increments of $n_x$ and $n_y$ due to a small change in U are:

$$\delta n_x = \frac{1}{2\sqrt{\frac{\Im^2(U_{12})}{1 - \Re^2(U_{11})}}} \left( \frac{2\Im(U_{12})\delta U_{12}(1 - \Re^2(U_{11})) + 2\Re(U_{11})\delta U_{11}\Im^2(U_{12})}{(1 - \Re^2(U_{11}))^2} \right), \quad (22)$$

$$\delta n_y = \pm \frac{1}{2\sqrt{\frac{\Re^2(U_{12})}{1 - \Re^2(U_{11})}}} \left( \frac{2\Re(U_{12})\delta U_{12}(1 - \Re^2(U_{11})) + 2\Re(U_{11})\delta U_{11}\Re^2(U_{12})}{(1 - \Re^2(U_{11}))^2} \right).$$

From equations (19) and (22), $\delta n_x$ and $\delta n_y$ can be found in terms of $\delta u_k(j)$, resulting in:

$$\frac{\delta n_x}{\delta u_k(j)} = \frac{1}{2n_x}\left( \frac{2\Im(U_{12})(1 - \Re^2(U_{11}))\Im(\tilde{U}_{12}) + 2\Re(U_{11})\Im^2(U_{12})\Re(\tilde{U}_{11})}{(1 - \Re^2(U_{11}))^2} \right), \quad (23)$$

$$\frac{\delta n_y}{\delta u_k(j)} = \frac{1}{2n_y}\left( \frac{2\Re(U_{12})(1 - \Re^2(U_{11}))\Im(\tilde{U}_{12}) + 2\Re(U_{11})\Re^2(U_{12})\Re(\tilde{U}_{11})}{(1 - \Re^2(U_{11}))^2} \right).$$

The equations in this Appendix are the analytical expressions for the derivatives of $n_\perp$ with respect to the controls, to the first order. Any function of $n_\perp$ can then be numerically optimized using the conjugate gradient method, which converges faster than the steepest descent method.

What is claimed is:

1. A method for applying a nuclear magnetic resonance (NMR) sequence, the method comprising:
    applying a series of refocusing pulses to a substance within an inhomogeneous static magnetic field, wherein each refocusing pulse in the series of refocusing pulses comprises:
        a central axis;
        a total pulse duration greater than $t_{180}$; and
        at least five segments that each comprise a phase, wherein the phase of each segment is substantially anti-symmetric about the central axis of each refocusing pulse.

2. The method of claim 1, wherein the phase of each segment is substantially symmetric about the central axis of each refocusing pulse.

3. The method of claim 2, wherein each segment has a phase of either 0 degrees or 180 degrees.

4. The method of claim 1, wherein the phase of each segment is within 36 degrees of a perfect anti-symmetry.

5. The method of claim 1, wherein each refocusing pulse comprises a substantially constant amplitude.

6. The method of claim 5, wherein the amplitude of each segment is within 10% of an average amplitude of the refocusing pulse.

7. The method of claim 1, wherein the at least five segments comprise segment durations between 0.08 times $t_{180}$ to 1.1 times $t_{180}$.

8. The method of claim 1, wherein the total pulse duration is greater than 1.414 times $t_{180}$.

9. The method of claim 1, further comprising:
    applying an excitation pulse to the substance, wherein the application of the excitation pulse is performed prior to the application of the series of refocusing pulses.

10. The method of claim 1, where the excitation pulse and the series of refocusing pulses comprise a Carr, Purcell, Meiboom and Gill (CPMG) sequence.

11. The method of claim 1, wherein the substance is a formation and the series of refocusing pulses are applied to the formation using a wellbore tool.

12. A nuclear magnetic resonance (NMR) system comprising:
    a coil for applying a NMR pulse sequence to a substance;
    a NMR transmitter coupled to the coil;
    a processor; and a memory storing instructions executable by the processor to provide the NMR pulse sequence to the NMR transmitter, wherein the NMR pulse sequence comprises a series of refocusing pulses and each refocusing pulse in the series of refocusing pulses comprises:
   a central axis;
   a total pulse duration greater than $t_{180}$; and
   at least five segments that each comprise a phase, wherein the phase of each segment is substantially anti-symmetric about the central axis of each refocusing pulse.

13. The NMR system of claim 12, wherein the NMR system is part of a wellbore tool for investigating formations.

14. The NMR system of claim 12, wherein the phase of each segment is substantially symmetric about the central axis of each refocusing pulse.

15. The NMR system of claim 14, wherein each segment has a phase of either 0 degrees or 180 degrees.

16. The NMR system of claim 12, wherein each refocusing pulse comprises a substantially constant amplitude.

* * * * *